US012533052B2

(12) United States Patent
Diener et al.

(10) Patent No.: US 12,533,052 B2
(45) Date of Patent: Jan. 27, 2026

(54) USER INTERFACES FOR GLUCOSE INSIGHT PRESENTATION

(71) Applicant: DexCom, Inc., San Diego, CA (US)

(72) Inventors: Alexander Michael Diener, San Diego, CA (US); Stacey Fischer, Berkeley, CA (US); Shaw Strothers, San Diego, CA (US); Justin Yuen, Oceanside, CA (US); Chad Patterson, San Diego, CA (US); Apurv Kamath, San Diego, CA (US); Drew Terry, San Diego, CA (US); Margaret A. Crawford, Encinitas, CA (US); Mark Derdzinski, La Jolla, CA (US); Sarah Kate Pickus, San Diego, CA (US); Lauren Hruby Jepson, San Diego, CA (US); Adam Noar, San Diego, CA (US); Douglas Scott Kanter, San Diego, CA (US); Sonya Ann Sokolash, Portland, OR (US)

(73) Assignee: Dexcom, Inc., San Diego, CA (US)

( * ) Notice: Subject to any disclaimer, the term of this patent is extended or adjusted under 35 U.S.C. 154(b) by 862 days.

(21) Appl. No.: 17/563,943

(22) Filed: Dec. 28, 2021

(65) Prior Publication Data

US 2022/0202320 A1 Jun. 30, 2022

Related U.S. Application Data

(60) Provisional application No. 63/131,721, filed on Dec. 29, 2020.

(51) Int. Cl.
*A61B 5/145* (2006.01)
*A61B 5/00* (2006.01)

(52) U.S. Cl.
CPC .......... *A61B 5/14532* (2013.01); *A61B 5/743* (2013.01); *A61B 5/7475* (2013.01)

(58) Field of Classification Search
CPC ... A61B 5/14532; A61B 5/743; A61B 5/7475; A61B 5/746; A61B 5/7435;
(Continued)

(56) References Cited

U.S. PATENT DOCUMENTS

| 10,453,573 B2 | 10/2019 | Greene et al. |
| 10,725,652 B2 | 7/2020 | Bhavaraju et al. |

(Continued)

FOREIGN PATENT DOCUMENTS

| AU | 2017311505 A1 | 1/2019 |
| CA | 2994995 A1 | 3/2017 |

OTHER PUBLICATIONS

International Search Report and Written Opinion for Application No. PCT/US2021/065391, mailed Apr. 19, 2022, 12 pages.

*Primary Examiner* — Abid A Mustansir
(74) *Attorney, Agent, or Firm* — PATTERSON + SHERIDAN, LLP

(57) ABSTRACT

User interfaces for glucose insight presentation are leveraged. A glucose monitoring application is configured to process glucose measurements to determine one or more glucose insights, e.g., about a user's glucose. The glucose measurements, for example, may be obtained from a glucose monitoring device that collects glucose measurements of the user at predetermined intervals, e.g., every five minutes. The glucose monitoring application configures a user interface, based on configuration data, to present one or more visual elements representative of the one or more glucose insights. For example, the glucose monitoring application may configure the user interface to include a visual element in the form of a color field which represents whether the user's current glucose measurement (e.g., the most recent glucose (Continued)

measurement obtained from the glucose monitoring device) is below, within, or above a glucose range.

33 Claims, 15 Drawing Sheets

(58) Field of Classification Search
CPC ... A61B 5/7445; A61B 5/7275; A61B 5/6833; A61B 5/6848
See application file for complete search history.

(56) References Cited

U.S. PATENT DOCUMENTS

| | | | |
|---|---|---|---|
| 2010/0095229 A1* | 4/2010 | Dixon | G16H 40/63 715/763 |
| 2014/0012117 A1 | 1/2014 | Mensinger et al. | |
| 2016/0113594 A1 | 4/2016 | Koehler et al. | |
| 2016/0113596 A1* | 4/2016 | Koehler | G16H 40/63 600/365 |
| 2016/0232322 A1 | 8/2016 | Mensinger et al. | |
| 2017/0329917 A1* | 11/2017 | McRaith | G16H 20/00 |
| 2018/0042559 A1* | 2/2018 | Cabrera, Jr. | G16H 50/30 |
| 2019/0246914 A1 | 8/2019 | Constantin et al. | |
| 2019/0381243 A1 | 12/2019 | Bowland et al. | |
| 2020/0196923 A1 | 6/2020 | Kamath et al. | |

* cited by examiner

USER INTERFACES FOR GLUCOSE INSIGHT PRESENTATION

RELATED APPLICATION

This application claims the benefit of U.S. Provisional Patent Application No. 63/131,721, filed Dec. 29, 2020, and titled "User Interfaces for Glucose Insight Presentation," the entire disclosure of which is hereby incorporated by reference.

BACKGROUND

Diabetes is a metabolic condition affecting hundreds of millions of people, and is one of the leading causes of death worldwide. For people living with Type I diabetes, access to treatment is critical to their survival and it can reduce adverse outcomes among people with Type II diabetes. With proper treatment, serious damage to the heart, blood vessels, eyes, kidneys, and nerves, due to diabetes can be avoided. Regardless of a type of diabetes (e.g., Type I or Type II), managing it successfully involves monitoring and oftentimes adjusting food and activity to control a person's blood glucose, such as to reduce severe fluctuations in and/or generally lower the person's glucose.

However, many conventional glucose monitoring applications utilize complicated and confusing user interfaces which provide glucose information in a manner that is difficult for users to understand, particularly users who have just recently started monitoring their glucose. Consequently, users may be unable to draw insights from the data and thus are unable to affect their behavior in a meaningful way in order to improve their glucose. Over time, these users often become overwhelmed and frustrated by the manner in which information is presented by these conventional glucose monitoring applications and thus discontinue use of these applications before improvements in their glucose and overall health can be realized. Moreover, as users increasingly utilize mobile devices (e.g., smart watches and smart phones) to access glucose monitoring information, the failure by conventional systems to provide meaningful glucose information in a manner that users can understand is further exacerbated by the constraints imposed by the small screens of these mobile devices.

SUMMARY

To overcome these problems, user interfaces for glucose insight presentation are leveraged. A glucose monitoring application is configured to process glucose measurements to determine one or more glucose insights, e.g., about a user's glucose. The glucose measurements, for example, may be obtained from a glucose monitoring device that collects glucose measurements of the user at predetermined intervals, e.g., every five minutes. The glucose monitoring application configures a user interface, based on configuration data, to present one or more visual elements representative of the one or more glucose insights. For example, the glucose monitoring application may configure the user interface to include a visual element in the form of a color field which represents whether the user's current glucose measurement (e.g., the most recent glucose measurement obtained from the glucose monitoring device) is below, within, or above a glucose range.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
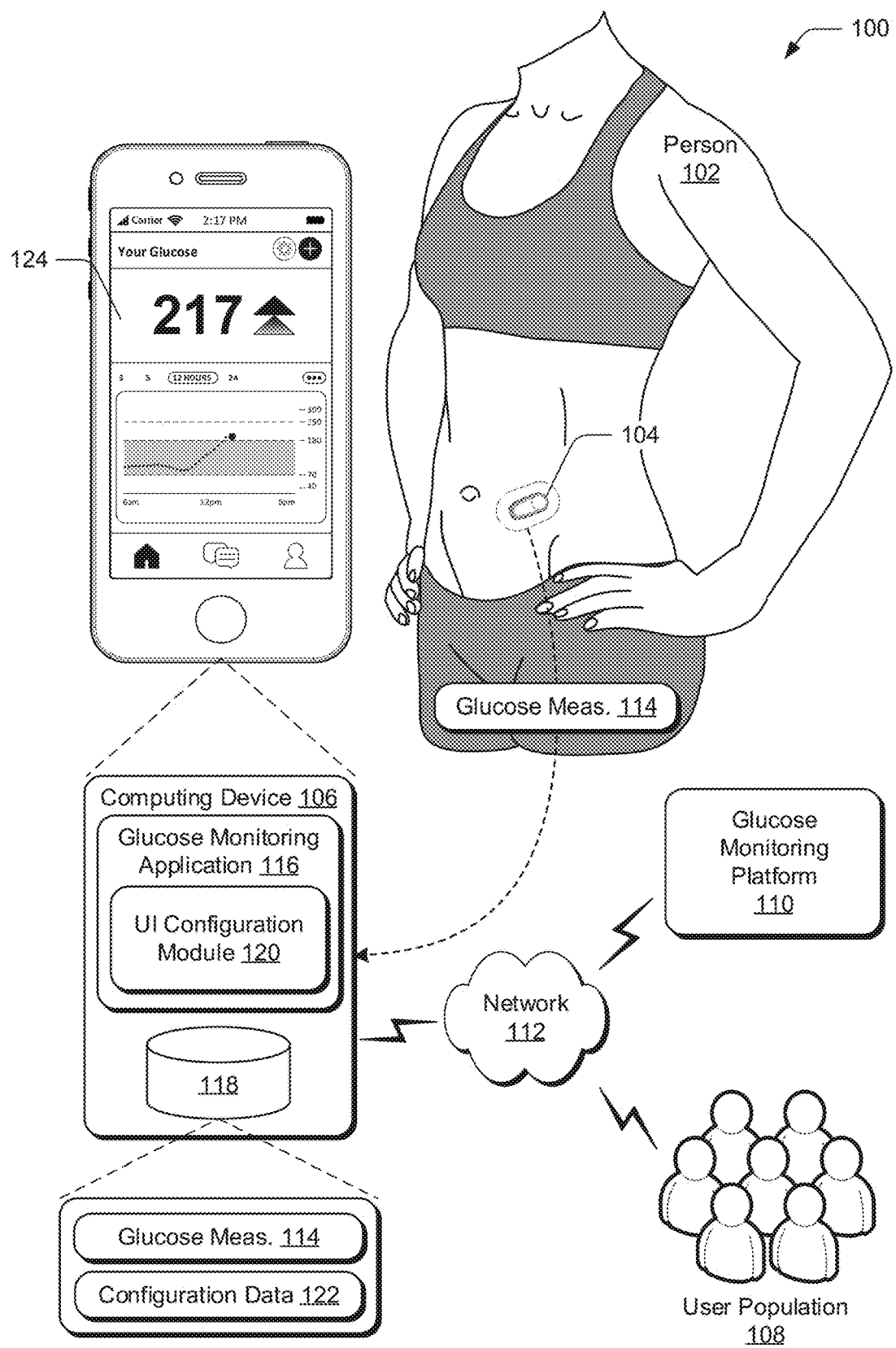
FIG. 1 is an illustration of an environment in an exemplary implementation that is operable to employ techniques described herein.

Conventional glucose monitoring applications may display complicated and confusing user interfaces which may include, for example, a glucose graph that plots glucose measurements for a user over time. In some cases, users may be confused about what the glucose measurements plotted over time mean, particularly users who have just recently started monitoring their glucose. Consequently, such users may be unable to draw insights from the data and thus are unable to affect their behavior to achieve health goals, e.g., glucose-based goals.

To overcome these problems, user interfaces for glucose insight presentation are described. A glucose monitoring application, implemented at a computing device such as a smartphone or smart watch, is configured to obtain glucose measurements from a glucose monitoring device that collects glucose measurements of a user. In some cases, for example, the glucose monitoring device is a wearable glucose monitoring device that collects glucose measurements from the user at predetermined intervals in real-time, e.g., every five minutes. The glucose monitoring application processes the glucose measurements to determine one or more glucose insights, e.g., about the user's glucose. The glucose insights may include, by way of example and not limitation, whether the current glucose measurement is below, within, or above a glucose range, a trend of the glucose measurements over a time period (e.g., whether the glucose measurements are increasing in value, decreasing in value, or constant over the time period), or a rate of change of the glucose measurements over a time period (e.g., how quickly the glucose measurements are increasing or decreasing in value). Notably, the glucose insights may be based on a variety of other data, in addition to glucose measurements, without departing from the spirit or scope of the described techniques. By way of example and not limitation, the glucose insights may be determined based on data describing other physiological markers (e.g., heartrate, heartrate variability, breathing, rate of blood flow, and so on), fitness or activities (e.g., steps, activity type, performance, and so forth), health conditions, a medication plan and/or medication taken, meals, stress, sleep, restorative events (e.g., meditation, massage), and so forth.

In accordance with the described techniques, the glucose monitoring application configures a user interface to present one or more visual elements representative of one or more determined glucose insights. This may include, for example, determining which glucose insights to present in the user interface as well as how to present the selected glucose insights to the user. In some cases, for example, the user interface is configured to present a limited number of visual elements representative of a limited number of glucose insights (e.g., one insight or two insights), while preventing the display of other information, e.g., without displaying a glucose graph or without displaying a number corresponding to current glucose level of the user.

As described throughout, a visual element is configured to visually represent the glucose insight, such as via a color field, symbol, shape, or other visual element. For example, rather than presenting a glucose graph which include numbers indicating glucose measurements, the glucose monitoring application may instead present a visual element indicating that the user's glucose is within a glucose range, e.g., by presenting a green color field in the user interface which indicates that the user is within the glucose range. As another example, the glucose monitoring application may present a shape that represents a glucose insight such as a trend of the glucose measurements over time or a rate of change of the glucose measurements over a time period. As compared to conventional approaches, this improved user interface presents glucose insights that are important to the user and are easy for the user to understand (e.g., a green color field means my glucose is good), while limiting the display of information (e.g., a glucose graph) that the user may not yet be able to understand.

In order to configure the user interface the glucose monitoring application may leverage configuration data which maps glucose insights to different visual elements and controls which glucose insights are presented to a particular user at a given time and how those insights are presented, e.g., which one or more visual elements are incorporated into the configured user interface based on the one or more determined glucose insights. Broadly speaking, the configuration data may specify which visual element to use for a particular glucose insight. The configuration data may also include various user specified preferences. For example, the glucose monitoring application may receive user input specifying that the user interface only present a single insight at a time. User preferences which are persisted in the configuration data may also be based on "implicit" and/or "explicit" user feedback.

In addition to user preferences, the configuration data may include rules that define a progression of insights for presentation to a user over time, such that initially the user interface is configured to present a single insight at a time via a respective visual element. After one or more criteria are satisfied, though, those rules may permit the user interface to be configured to present two insights of different types concurrently via respective visual elements. Such a progression may have a number of such "reveals," where more and/or different types of insights are permitted for inclusion in the user interface at each reveal. Presentation of different numbers of insights via the user interface over time may educate a user about their glucose and effects of their behavior on their glucose. It is to be appreciated, therefore, that the insights presented in the configured user interface, as well as the way in which the insights are presented using visual elements, may vary over time based on the configuration data.

By presenting visual elements to represent glucose insights, the improved user interface described herein provides information that a user can easily understand with just a quick glance. When the visual element has a color indicating that the user's most recent glucose measurement is within a desired range, for example, the user is able to understand this insight from the user interface with just a quick glance. This contrasts with having to focus on a glucose graph, locate a representation of a most recent glucose measurement, and determine whether a location of the representation is within a region of the graph that corresponds to the desired range. Configuring a user interface with visual elements to represent glucose insights can be particularly advantageous with mobile devices, such as smart watches, which may have limited screen space for displaying information and also may limit inputs for obtaining detailed information.

Moreover, configuring the user interface to display meaningful insights in a manner that is easy for the user to comprehend, while reducing the presentation of information that can be difficult for users to understand (e.g., the glucose graph), enables the user to better understand and focus on a limited number of glucose insights (e.g., time in range) generated by the glucose monitoring application. Doing so enables users to better understand insights about their glucose, which leads users to make meaningful changes to improve their glucose and long-term health. Moreover, the configuration data, in some instances, adjusts the insights which are presented to the user over time to account for improvement in the user's understanding of their glucose. The improved user interface, therefore, improves the consistency of users utilizing the glucose monitoring application which results in improved glucose control and long-term health benefits for the user.

In the following discussion, an exemplary environment is first described that may employ the techniques described herein. Examples of implementation details and procedures are then described which may be performed in the exemplary environment as well as other environments. Performance of the exemplary procedures is not limited to the exemplary environment and the exemplary environment is not limited to performance of the exemplary procedures.

Example of an Environment

FIG. 1 is an illustration of an environment 100 in an example of an implementation that is operable to employ user interfaces for glucose insight presentation as described herein. The illustrated environment 100 includes person 102, who is depicted wearing a wearable glucose monitoring device 104. The illustrated environment 100 also includes computing device 106, other users in a user population 108 that wear glucose monitoring devices 104, and glucose monitoring platform 110. The wearable glucose monitoring device 104, computing device 106, user population 108, and glucose monitoring platform 110 are communicatively coupled, including via a network 112.

Alternately or additionally, the wearable glucose monitoring device 104 and the computing device 106 may be communicatively coupled in other ways, such as using one or more wireless communication protocols or techniques. By way of example, the wearable glucose monitoring device 104 and the computing device 106 may communicate with one another using one or more of Bluetooth (e.g., Bluetooth Low Energy links), near-field communication (NFC), 5G, and so forth.

In accordance with the described techniques, the wearable glucose monitoring device 104 is configured to provide measurements of person 102's glucose. Although a wearable glucose monitoring device is discussed herein, it is to be appreciated that user interfaces for glucose monitoring may be generated and presented in connection with other devices capable of providing glucose measurements, e.g., non-wearable glucose devices such as blood glucose meters requiring finger sticks, patches, and so forth. In implementations that involve the wearable glucose monitoring device 104, though, it may be configured with a glucose sensor that continuously detects analytes indicative of the person 102's glucose and enables generation of glucose measurements. In the illustrated environment 100 and throughout the detailed description these measurements are represented as glucose measurements 114.

In one or more implementations, the wearable glucose monitoring device 104 is a continuous glucose monitoring ("CGM") system. As used herein, the term "continuous" used in connection with glucose monitoring may refer to an ability of a device to produce measurements substantially continuously, such that the device may be configured to produce the glucose measurements 114 at intervals of time (e.g., every hour, every 30 minutes, every 5 minutes, and so forth), responsive to establishing a communicative coupling with a different device (e.g., when a computing device establishes a wireless connection with the wearable glucose monitoring device 104 to retrieve one or more of the measurements), and so forth This functionality along with further aspects of the wearable glucose monitoring device 104's configuration are discussed in more detail in relation to FIG. 2.

Additionally, the wearable glucose monitoring device 104 transmits the glucose measurements 114 to the computing device 106, such as via a wireless connection. The wearable glucose monitoring device 104 may communicate these measurements in real-time, e.g., as they are produced using a glucose sensor. Alternately or in addition, the wearable glucose monitoring device 104 may communicate the glucose measurements 114 to the computing device 106 at set time intervals. For example, the wearable glucose monitoring device 104 may be configured to communicate the glucose measurements 114 to the computing device 106 every five minutes (as they are being produced).

Certainly, an interval at which the glucose measurements 114 are communicated may be different from the examples above without departing from the spirit or scope of the described techniques. The measurements may be communicated by the wearable glucose monitoring device 104 to the computing device 106 according to other bases in accordance with the described techniques, such as based on a request from the computing device 106. Regardless, the computing device 106 may maintain the glucose measurements 114 of the person 102 at least temporarily, e.g., in computer-readable storage media of the computing device 106.

Although illustrated as a mobile device (e.g., a mobile phone), the computing device 106 may be configured in a variety of ways without departing from the spirit or scope of the described techniques. By way of example and not limitation, the computing device 106 may be configured as a different type of mobile device (e.g., a wearable device or tablet device). In one or more implementations, the computing device 106 may be configured as a dedicated device associated with the glucose monitoring platform 110, e.g., with functionality to obtain the glucose measurements 114 from the wearable glucose monitoring device 104, perform various computations in relation to the glucose measurements 114, display information related to the glucose measurements 114 and the glucose monitoring platform 110, communicate the glucose measurements 114 to the glucose monitoring platform 110, and so forth.

Additionally, the computing device 106 may be representative of more than one device in accordance with the described techniques. In one or more scenarios, for instance, the computing device 106 may correspond to both a wearable device (e.g., a smart watch) and a mobile phone. In such scenarios, both of these devices may be capable of performing at least some of the same operations, such as to receive the glucose measurements 114 from the wearable glucose monitoring device 104, communicate them via the network 112 to the glucose monitoring platform 110, display information related to the glucose measurements 114, and so forth. Alternately or in addition, different devices may have different capabilities that other devices do not have or that are limited through computing instructions to specified devices.

In the scenario where the computing device 106 corresponds to a separate smart watch and a mobile phone, for instance, the smart watch may be configured with various sensors and functionality to measure a variety of physiological markers (e.g., heartrate, heartrate variability, breathing, rate of blood flow, and so on) and activities (e.g., steps or other exercise) of the person 102. In this scenario, the mobile phone may not be configured with these sensors and functionality, or it may include a limited amount of that functionality—although in other scenarios a mobile phone may be able to provide the same functionality. Continuing with this particular scenario, the mobile phone may have capabilities that the smart watch does not have, such as a camera to capture images associated with glucose monitoring and an amount of computing resources (e.g., battery and processing speed) that enables the mobile phone to more efficiently carry out computations in relation to the glucose measurements 114. Even in scenarios where a smart watch is capable of carrying out such computations, computing instructions may limit performance of those computations to the mobile phone so as not to burden both devices and to utilize available resources efficiently. To this extent, the computing device 106 may be configured in different ways and represent different numbers of devices than discussed herein without departing from the spirit and scope of the described techniques.

In accordance with the discussed techniques, the computing device 106 is configured to implement user interfaces for glucose insight presentation. In the environment 100, the computing device 106 includes glucose monitoring application 116 and storage device 118. Here, the glucose monitoring application 116 includes the user interface configuration module 120. Further, the glucose measurements 114 and configuration data 122 are shown stored in the storage device 118. The storage device 118 may represent one or more databases and also other types of storage capable of storing the glucose measurements 114 and the configuration data 122.

In one or more implementations, the glucose measurements 114 and/or the configuration data 122 may be stored at least partially remote from the computing device 106, e.g., in storage of the glucose monitoring platform 110, and retrieved or otherwise accessed in connection with configuring and outputting (e.g., displaying) user interfaces for glucose insight presentation. For instance, the glucose measurements 114 and/or the configuration data 122 may be generally stored in storage of the glucose monitoring platform 110 along with the glucose measurements and/or the configuration data 122 of the user population 108, and some of that data may be retrieved or otherwise accessed on an as-needed basis to display user interfaces for glucose insight presentation.

Broadly speaking, the glucose monitoring application 116 is configured to support interactions with a user that enable insights about the user's glucose to be presented in a customized manner This may include, for example, obtaining the glucose measurements 114 for processing (e.g., to determine a glucose insight), receiving information about a user (e.g., through an onboarding process and/or user feedback), causing alerts to be output, causing information to be communicated to a health care provider, causing information to be communicated to the glucose monitoring platform 110, and so forth.

In one or more implementations, the glucose monitoring application 116 also leverages resources of the glucose monitoring platform 110 in connection with user interfaces for glucose insight presentation. As noted above, for instance, the glucose monitoring platform 110 may be configured to store data, such as the glucose measurements 114 and the configuration data 122 associated with a user (e.g., the person 102) and/or users of the user population 108. The glucose monitoring platform 110 may also provide updates and/or additions to the glucose monitoring application 116. Further still, the glucose monitoring platform 110 may train, maintain, and/or deploy algorithms (e.g., machine learning algorithms) to generate predictions in connection with determining glucose insights, such as by using the wealth of data collected from the person 102 and the users of the user population 108. One or more such algorithms may require an amount of computing resources that exceeds the resources of typical, personal computing devices, e.g., mobile phones, laptops, tablet devices, and wearables, to name just a few. Nonetheless, the glucose monitoring platform 110 may include or otherwise have access to the amount of resources needed to operate such algorithms, e.g., cloud storage, server devices, virtualized resources, and so forth. The glucose monitoring platform 110 may provide a variety of resources that the glucose monitoring application 116 leverages in connection with enabling glucose insights to be presented via user interfaces.

In accordance with the described techniques, the glucose monitoring application 116 is configured to utilize the user interface configuration module 120 to configure and cause output of one or more user interfaces that present glucose insights. The user interface configuration module 120 may configure user interface 124, for instance, and the glucose monitoring application 116 may cause display of the configured user interface 124 via a display device of the computing device 106. By way of example, the user interface configuration module 120 may configure the user interface 124 based on the configuration data 122 to include one or more visual elements representative of respective glucose insights.

Broadly speaking, the configuration data 122 controls which glucose insights are presented to a particular user at a given time and how those insights are presented. In one or more implementations, for instance, the configuration data 122 may comprise user specified preferences. For example, the glucose monitoring application 116 may receive user input specifying that the user interface 124 only present a single insight at a time. In this scenario, the glucose monitoring application 116 may cause this preference to be persisted in the configuration data 122, such that when the user interface configuration module 120 configures the user interface 124 the module configures the interface to present only a single determined insight via a respective visual element at a time.

Alternatively or additionally, the configuration data 122 may include rules that define a progression of insights for presentation to a user over time, such that initially the user interface configuration module 120 is limited to configuring the user interface 124 to present a single insight at a time via a respective visual element. After one or more criteria are satisfied, though, those rules may permit the user interface configuration module 120 to configure the user interface 124 to present two insights of different types concurrently via respective visual elements. Such a progression may have a number of such "reveals," where more and/or different types of insights are permitted for inclusion in the user interface at each reveal. In this way, the user interface configuration module 120, through presentation of different numbers of insights via the user interface 124 over time, may educate a user about their glucose and effects of their behavior on their glucose. The rules of such a progression may also define that after one or more criteria are met, the user interface configuration module 120 may be permitted to configure the user interface 124 to present a glucose graph that plots the glucose measurements 114 over time concurrently with one or more glucose insights.

As discussed above and below, a variety of insights may be determined based on the glucose measurements 114 of the user without in accordance with the described techniques. In the context of measuring glucose, e.g., continuously, and obtaining data describing such measurements, consider the following discussion of FIG. 2.

Figure 2:
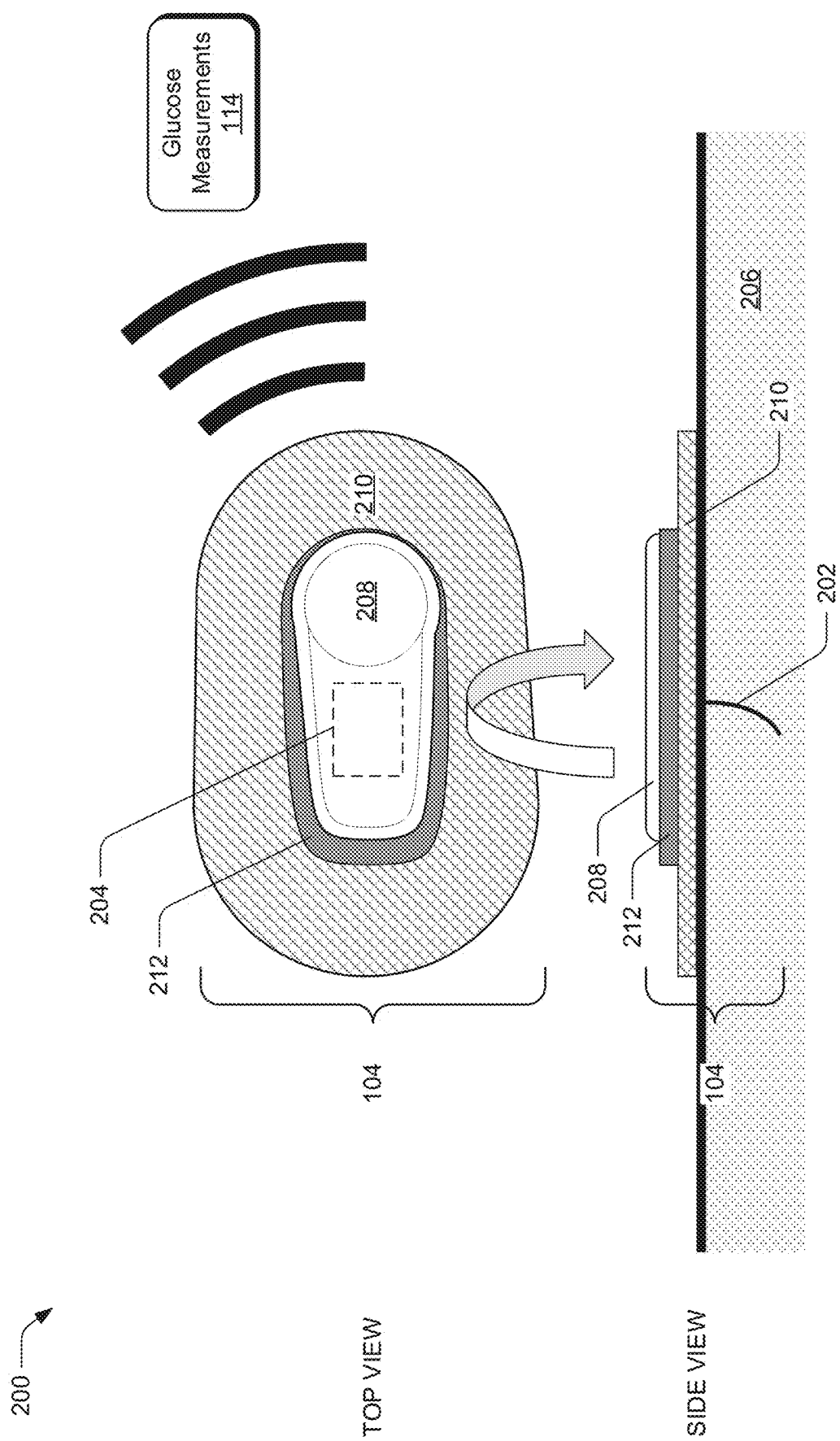
FIG. 2 depicts an example of the wearable glucose monitoring device of FIG. 1 in greater detail.

FIG. 2 depicts an example of an implementation 200 of the wearable glucose monitoring device 104 of FIG. 1 in greater detail. In particular, the illustrated example 200 includes a top view and a corresponding side view of the wearable glucose monitoring device 104. It is to be appreciated that the wearable glucose monitoring device 104 may vary in implementation from the following discussion in various ways without departing from the spirit or scope of the described techniques. As noted above, for instance, user interfaces for glucose insight presentation may be configured and displayed (or otherwise output) in connection with other types of devices for glucose monitoring, such as non-wearable devices (e.g., blood glucose meters requiring finger sticks), patches, and so forth.

In this example 200, the wearable glucose monitoring device 104 is illustrated to include a sensor 202 and a sensor module 204. Here, the sensor 202 is depicted in the side view having been inserted subcutaneously into skin 206, e.g., of the person 102. The sensor module 204 is depicted in the top view as a dashed rectangle. The wearable glucose monitoring device 104 also includes a transmitter 208 in the illustrated example 200. Use of the dashed rectangle for the sensor module 204 indicates that it may be housed or otherwise implemented within a housing of the transmitter 208. In this example 200, the wearable glucose monitoring device 104 further includes adhesive pad 210 and attachment mechanism 212.

In operation, the sensor 202, the adhesive pad 210, and the attachment mechanism 212 may be assembled to form an application assembly, where the application assembly is configured to be applied to the skin 206 so that the sensor 202 is subcutaneously inserted as depicted. In such scenarios, the transmitter 208 may be attached to the assembly after application to the skin 206 via the attachment mechanism 212. Alternatively, the transmitter 208 may be incorporated as part of the application assembly, such that the sensor 202, the adhesive pad 210, the attachment mechanism 212, and the transmitter 208 (with the sensor module 204) can all be applied at once to the skin 206. In one or more implementations, this application assembly is applied to the skin 206 using a separate sensor applicator (not shown). Unlike the finger sticks required by conventional blood glucose meters, the user initiated application of the wearable glucose monitoring device 104 is nearly painless and does not require the withdrawal of blood. Moreover, the automatic sensor applicator generally enables the person 102 to embed the sensor 202 subcutaneously into the skin 206 without the assistance of a clinician or healthcare provider.

The application assembly may also be removed by peeling the adhesive pad 210 from the skin 206. It is to be appreciated that the wearable glucose monitoring device 104 and its various components as illustrated are simply one example form factor, and the wearable glucose monitoring device 104 and its components may have different form factors without departing from the spirit or scope of the described techniques.

In operation, the sensor 202 is communicatively coupled to the sensor module 204 via at least one communication channel which can be a wireless connection or a wired connection. Communications from the sensor 202 to the sensor module 204 or from the sensor module 204 to the sensor 202 can be implemented actively or passively and these communications can be continuous (e.g., analog) or discrete (e.g., digital).

The sensor 202 may be a device, a molecule, and/or a chemical which changes or causes a change in response to an event which is at least partially independent of the sensor 202. The sensor module 204 is implemented to receive indications of changes to the sensor 202 or caused by the sensor 202. For example, the sensor 202 can include glucose oxidase which reacts with glucose and oxygen to form hydrogen peroxide that is electrochemically detectable by the sensor module 204 which may include an electrode. In this example, the sensor 202 may be configured as or include a glucose sensor configured to detect analytes in blood or interstitial fluid that are indicative of glucose level using one or more measurement techniques. In one or more implementations, the sensor 202 may also be configured to detect analytes in the blood or the interstitial fluid that are indicative of other markers, such as lactate levels, which may improve accuracy in generating various predictions in connection with determining glucose insights. Additionally or alternately, the wearable glucose monitoring device 104 may include additional sensors to the sensor 202 to detect those analytes indicative of the other markers.

In another example, the sensor 202 (or an additional sensor of the wearable glucose monitoring device 104—not shown) can include a first and second electrical conductor and the sensor module 204 can electrically detect changes in electric potential across the first and second electrical conductor of the sensor 202. In this example, the sensor module 204 and the sensor 202 are configured as a thermocouple such that the changes in electric potential correspond to temperature changes. In some examples, the sensor module 204 and the sensor 202 are configured to detect a single analyte, e.g., glucose. In other examples, the sensor module 204 and the sensor 202 are configured to detect multiple analytes, e.g., sodium, potassium, carbon dioxide, and glucose. Alternately or additionally, the wearable glucose monitoring device 104 includes multiple sensors to detect not only one or more analytes (e.g., sodium, potassium, carbon dioxide, glucose, and insulin) but also one or more environmental conditions (e.g., temperature). Thus, the sensor module 204 and the sensor 202 (as well as any additional sensors) may detect the presence of one or more analytes, the absence of one or more analytes, and/or changes in one or more environmental conditions.

In one or more implementations, the sensor module 204 may include a processor and memory (not shown). The sensor module 204, by leveraging the processor, may generate the glucose measurements 114 based on the communications with the sensor 202 that are indicative of the above-discussed changes. Based on these communications from the sensor 202, the sensor module 204 is further configured to generate communicable packages of data that include at least one glucose measurement 114. In one or more implementations, the sensor module 204 may configure those packages to include additional data, including, by way of example and not limitation, a sensor identifier, a sensor status, temperatures that correspond to the glucose measurements 114, measurements of other analytes that correspond to the glucose measurements 114, and so forth. It is to be appreciated that such packets may include a variety of data in addition to at least one glucose measurement 114 without departing from the spirit or scope of the described techniques.

In implementations where the wearable glucose monitoring device 104 is configured for wireless transmission, the transmitter 208 may transmit the glucose measurements 114 wirelessly as a stream of data to a computing device. Alternately or additionally, the sensor module 204 may buffer the glucose measurements 114 (e.g., in memory of the sensor module 204 and/or other physical computer-readable storage media of the wearable glucose monitoring device 104) and cause the transmitter 208 to transmit the buffered glucose measurements 114 later at various intervals, e.g., time intervals (every second, every thirty seconds, every minute, every five minutes, every hour, and so on), storage intervals (when the buffered glucose measurements 114 reach a threshold amount of data or a number of measurements), and so forth.

Having considered an example of an environment and an example of a wearable glucose monitoring device, consider now a discussion of some examples of details of the techniques for user interfaces for glucose insight presentation in a digital medium environment in accordance with one or more implementations.

User Interfaces for Glucose Insight Presentation

Figure 3:
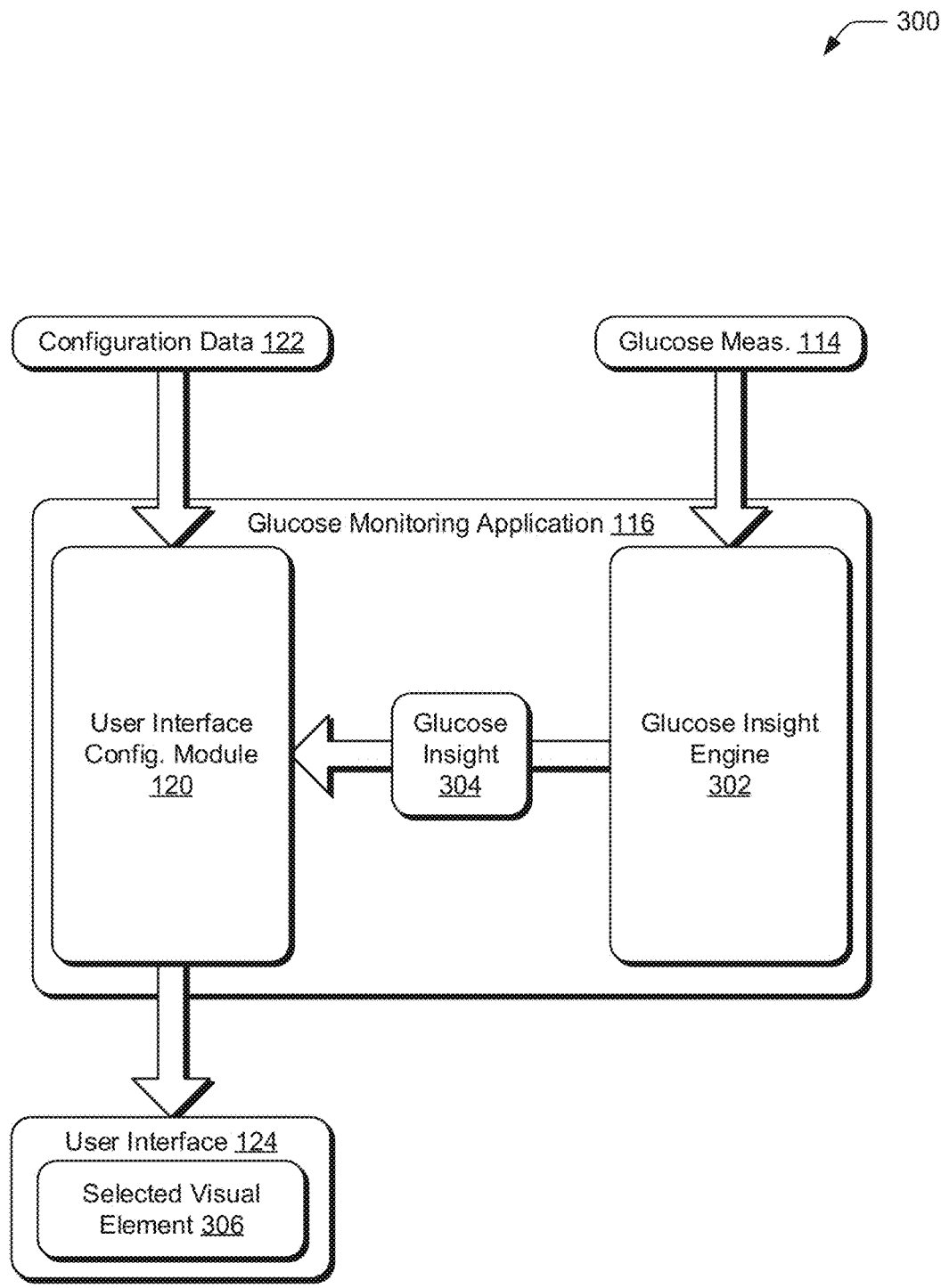
FIG. 3 depicts an example of a system in which the glucose monitoring application of FIG. 1 leverages a user interface configuration module and a glucose insight engine to configure a user interface for display.

FIG. 3 depicts an example 300 of a system in which a glucose monitoring application of FIG. 1 leverages a user interface configuration module and a glucose insight engine to configure a user interface for display. The illustrated example 300 includes from FIG. 1 the glucose monitoring application 116 having the user interface configuration module 120 and also includes the glucose measurements 114 and the configuration data 122.

In the illustrated example 300, the glucose monitoring application 116 further includes the glucose insight engine 302. Broadly speaking, the glucose insight engine 302 is configured to process the glucose measurements 114 to determine one or more glucose insights 304, e.g., about the person 102's glucose. The user interface configuration module 120 is configured to configure a user interface based on the configuration data 122 to present one or more visual elements representative of the glucose insights 304. This includes selecting or otherwise determining a visual element representative of a determined glucose insight 304. As output of these steps, the user interface configuration module 120 produces the configured user interface 124 having a selected visual element 306, which is indicative of the determined glucose insight 304.

As noted above, the glucose insight engine 302 is configured to determine the glucose insights 304. Here, the glucose insight engine 302 is depicted obtaining the glucose measurements 114. By way of example and not limitation, the glucose insight engine 302 may obtain the glucose measurements 114 from any one or more of the wearable glucose monitoring device 104, the storage device 118, or storage of the glucose monitoring platform 110. In particular, the glucose insight engine 302 may obtain the glucose measurements of the person 102. Additionally, the person 102 may correspond to a user of the computing device 106, such that the person 102 is able to view the configured user interface 124 which includes a selected visual element 306 indicative of a glucose insight 304 determined about her or his glucose. In addition or alternatively, the glucose insight engine 302 may obtain the glucose measurements 114 of other users of the user population 108 and determine the glucose insight 304 about the glucose of the person 102 in relation to glucose of users of the user population 108.

Certainly, the glucose insight engine 302 may not be limited to determining glucose insights based solely on the glucose measurements 114 of the person 102 and/or the glucose measurements 114 of other users of the user population 108 in one or more implementations. Instead, the glucose insight engine 302 may determine the glucose insight 304 further based on a variety of other data without departing from the spirit or scope of the described techniques. By way of example and not limitation, the glucose insight engine 302 may determine the glucose insight 304 based on data describing other physiological markers (e.g., heartrate, heartrate variability, breathing, rate of blood flow, and so on), fitness or activities (e.g., steps, activity type, performance, and so forth), health events, medication plans and/or medication taken, meals, stress, sleep, restorative events (e.g., meditation, massage), and so forth.

Moreover, the glucose insight engine 302 may be configured to determine a variety of glucose insights 304 based on the glucose measurements 114. At a given time, for instance, the glucose insight engine 302 may determine a single glucose insight 304 or may determine a plurality of glucose insights 304. The glucose insights 304 may include, by way of example and not limitation, a current glucose measurement 114, how a current glucose measurement 114 compares to one or more other glucose measurements 114 for a same or similar time of day on different days, how one or more glucose measurements 114 compare to one or more other glucose measurements 114 for a same meal (e.g., breakfast, a snack, lunch, or dinner) on different days, whether the current glucose measurement 114 is below, within, or above a glucose range, a trend of the glucose measurements 114 over a time period (e.g., whether the glucose measurements are increasing in value, decreasing in value, or constant over the time period), a rate of change of the glucose measurements 114 over a time period (e.g., how quickly the glucose measurements are increasing or decreasing in value over the time period), a variability of the glucose measurements 114 over the time period, and how a variability of the glucose measurements 114 at a first time period (e.g., a "current" time period) compares to a variability of the glucose measurements 114 at one or more other time periods (e.g., one or more historical time periods), to name just a few.

In one or more implementations, the above-noted range to which the glucose measurements 114 are compared may be variable over the course of a day. For example, the range may be wider around determined meal times or determined exercise times and narrower at determined between-meal times and at night. Alternatively or additionally, the above-noted range may become narrower over time, such as responsive to a determination that the person 102's glucose measurements 114 have less variability than previously, e.g., as a result of the person 102 developing or changing behaviors which better control the person 102's glucose. In one or more implementations, the range may be set (or initially set) by a health care provider of the person 102. The health care provider may have access (e.g., through a provider portal) to update the range subsequently and/or the glucose monitoring application 116 or the glucose monitoring platform 110 may update the range, e.g., in the manners mentioned above or in other ways. Further still, the range may be set (or initially set) by a user of the glucose monitoring application 116 (e.g., the person), such as while onboarding with the glucose monitoring application 116 and/or initiating a wearable glucose monitoring system 104 to produce the glucose measurements 114. Like the health care provider, the user may have access (e.g., via the glucose monitoring application 116) to update the range subsequently and/or the glucose monitoring application 116 or the glucose monitoring platform 110 may update the range, e.g., in the manners mentioned above or in other ways. In at least one implementation, though, the glucose monitoring application 116 may prevent the user from setting and/or updating this range. Moreover, a health care provider (e.g., via a portal) and/or the user (e.g., via the glucose monitoring application) may be able to set different glucose ranges for different time periods (e.g., different times of day), such as different glucose ranges around meal times or during the night. It is to be appreciated that the range or ranges to which glucose measurements are compared to determine glucose insights may vary in numerous ways without departing from the spirit or scope of the described techniques.

Here, the user interface configuration module 120 is depicted obtaining the glucose insight 304. Although the user interface configuration module 120 is depicted in this example 300 obtaining the glucose insight 304 from the glucose insight engine 302, which is illustrated as local to the glucose monitoring application 116 and thus the computing device 106, in one or more implementations, the user interface configuration module 120 may obtain the glucose insight 304 from a different source. For example, the user interface configuration module 130 may obtain the glucose insight 304 over the network 112 from the glucose monitoring platform 110 or a different source that is remote from the computing device 106. To this end, the glucose insight engine 302 may thus be implemented at least in part at the glucose monitoring platform 110 and/or at a different remote source in one or more implementations. In at least one implementation, though, the glucose insight engine 302 may be implemented entirely at the glucose monitoring platform 110.

Given this, it follows that the user interface configuration module 120 may obtain one or more glucose insights 304 from a local source (e.g., when the glucose insight engine 302 is implemented locally at the computing device 106), from a remote source (e.g., when the glucose insight engine 302 is implemented at the glucose monitoring platform 110 remote from the computing device 106), or from some combination of local and remote sources (e.g., when the glucose insight engine 302 is implemented in part at the computing device 106 and in part at the glucose monitoring platform 110). In scenarios where the glucose insight engine 302 is implemented in part at the computing device 106 and in part at the glucose monitoring platform 110, the portion at the computing device 106 and the portion at the glucose monitoring platform 110 may determine different glucose insights 304, e.g., to reduce latency of providing a particular insight and/or because determining a particular insight may require an amount of computing resources that is a burden to operation of the computing device 106 (or simply is not possible with the computing device 106's resources). It is to be appreciated that the user interface configuration module 120 may obtain the one or more glucose insights 304 from different sources without departing from the spirit or scope of the described techniques.

Based on the glucose insight 304, the user interface configuration module 120 configures a user interface and thus produces the configured user interface 124 with the selected visual element 306, e.g., which is indicative of the obtained glucose insight 304. Notably, the user interface configuration module 120 produces the configured user interface 124 in accordance with the configuration data 122. As noted above, the configuration data 122 generally controls which glucose insights are presented to a particular user at a given time and how those insights are presented, e.g., which one or more visual elements are incorporated into the configured user interface 124 based on the one or more determined glucose insights 304.

In one or more implementations, for instance, the configuration data 122 may comprise user specified preferences. For example, the glucose monitoring application 116 may receive user input specifying that the user interface 124 only present a single insight at a time. In this scenario, the glucose monitoring application 116 may cause this preference to be persisted in the configuration data 122, such that when the user interface configuration module 120 configures the user interface 124, the module configures the interface to present only a single determined insight via a respective visual element at a time. User preferences which are persisted in the configuration data 122 may also be based on user feedback.

In implementations where the configuration data 122 persists preferences that are based on user feedback, this feedback may be "explicit" or "implicit." As used herein, the term "explicit feedback" refers to feedback that a user knowingly provides in relation to a visual element displayed as part of a user interface. By way of example, a user that is prompted to provide feedback about a visual element (e.g., by display of a selectable thumbs up or thumbs down in relation to the visual element) and then provides such feedback (e.g., by selecting the thumbs up or thumbs down), knowingly provides feedback about the visual element and thus provides explicit feedback. Another example of explicit feedback is providing a rating, e.g., out of 5 stars or 1-10, about a visual element. Rather than prompt a user to provide feedback, explicit feedback may also include a user selection not to display certain visual elements as part of a configured user interface 124. One example of this is a selection not to display visual elements that have different colors based on the determined glucose insight, e.g., this may be the case in a scenario where the user is color blind and thus unable to distinguish between different colors. Another example is when a user selects not to display a glucose trend graph as part of the configured user interface 124. In addition to not displaying visual elements (e.g., feedback to omit visual elements), explicit user feedback can also include selections to affirmatively display various visual elements, such as an affirmative selection to display a color field that can be indicative of insights, a current glucose number, shapes indicative of trends in glucose (e.g., increasing, decreasing, or remaining constant), and so on. It is to be appreciated that a user may provide a variety of explicit feedback regarding which visual elements to display, which visual elements not to display, which visual elements the user prefers, which visual elements the user does not prefer, and so on, in accordance with the described techniques. This explicit feedback may be obtained and persisted in the configuration data 122 to control which visual elements are determined for inclusion in the configured user interface 124.

As noted above, the feedback may also be implicit. As used herein, the term "implicit feedback" refers to feedback that is not explicit regarding a visual element, but corresponds to a detected user action in relation to the visual element indicative of a preference or non-preference for the visual element. By way of example, implicit feedback may include navigating to a different view or a different visual element to obtain information. Implicit feedback may also include, for example, using the glucose monitoring application 116 less than previously (e.g., viewing the visual element less), behaving in a way that can be detrimental to achieving glucose goals (e.g., lowering or remaining steady) as measured by glucose values and/or other health indicators, switching to a different application, and dismissing or snoozing notifications, to name just a few. Like with explicit feedback, the user interface configuration module 120 may capture a variety of implicit feedback about which visual elements to display, which visual elements not to display, which visual elements the user prefers, which visual elements the user does not prefer, and so on, in accordance with the described techniques. This implicit feedback may be obtained and persisted in the configuration data 122 to control which visual elements are determined for inclusion in the configured user interface 124.

In addition to user preferences, the configuration data 122 may include rules that define a progression of insights for presentation to a user over time, such that initially the user interface configuration module 120 is limited to configuring the user interface 124 to present a single insight at a time via a respective visual element. After one or more criteria are satisfied, though, those rules may permit the user interface configuration module 120 to configure the user interface 124 to present two insights of different types concurrently via respective visual elements. Such a progression may have a number of such "reveals," where more and/or different types of insights are permitted for inclusion in the user interface at each reveal. In this way, the user interface configuration module 120, through presentation of different numbers of insights via the user interface 124 over time, may educate a user about their glucose and effects of their behavior on their glucose. The rules of such a progression may also define that after one or more criteria are met, the user interface configuration module 120 may be permitted to configure the user interface 124 to present a glucose graph that plots the glucose measurements 114 over time concurrently with one or more glucose insights. It is to be appreciated that the configuration data 122 may control which glucose insights can be presented via respective visual elements in a configured user interface in a variety of ways in accordance with the described techniques.

Additionally, the configuration data 122 controls how the glucose insights are presented depending on the glucose insights determined. Broadly speaking, the configuration data 122 may specify which visual element to use for a particular glucose insight 304 determined. By way of example, the configuration data 122 may define that for a first glucose insight (e.g., the person 102's most recent glucose measurement 114 is above a range) configure the user interface to include a first colored visual element (e.g., an orange color field), for a second glucose insight (e.g., the person 102's most recent glucose measurement 114 is within the range) configure the user interface to include a second colored visual element (e.g., a green color field), and for a third glucose insight (e.g., the person 102's most recent glucose measurement 114 is below the range) configure the user interface to include a third colored visual element (e.g., a yellow color field).

In one or more implementations, the configuration data 122 comprises a mapping of glucose insights to visual elements, such that the user interface configuration module 120 selects or otherwise determines the visual element to include in the user interface depending on the glucose insight 304 determined. For example, this mapping may be a list of visual elements and respective glucose insights, such that if a glucose insight is obtained, the user interface configuration module 120 can reference the list to identify the respective visual element. Alternatively or additionally, such a list may be configured as logic comprising if/then statements that the user interface configuration module 120 processes to determine the one or more visual elements with which to configure the user interface, such that "if" a given glucose insight is received the user interface configuration module 120 can process the statements to identify the visual element that is "then" used with the user interface. The configuration data 122 may control "how" insights are presented as part of the configured user interface 124 in different ways without departing from the spirit or scope of the described techniques. In the context of user interfaces that may be presented with different visual elements consider the following discussion of FIGS. 4-12.

Figure 4:
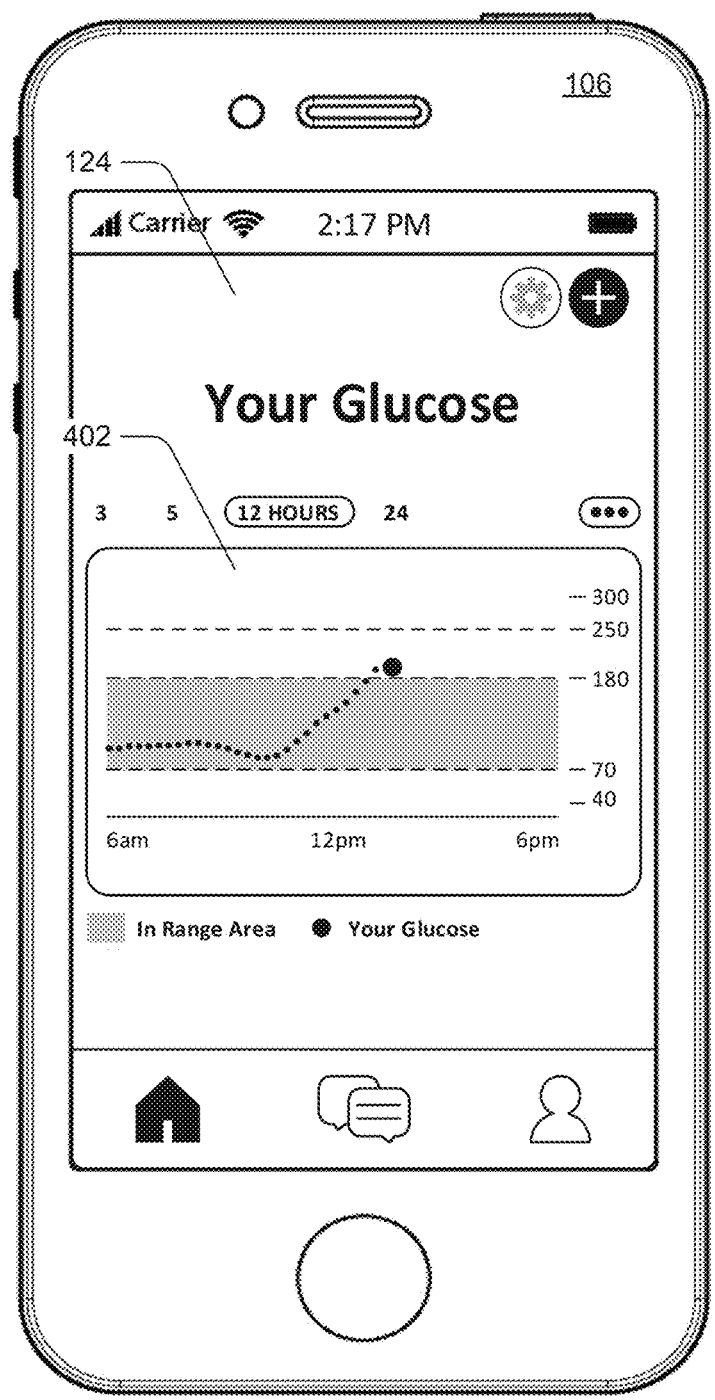
FIG. 4 depicts an example of an implementation of a user interface displaying a glucose graph that plots values of glucose measurements of a user over time.

FIG. 4 depicts an example 400 of an implementation of a user interface displaying a glucose graph that plots values of glucose measurements of a user over time. The illustrated example 400 includes from FIG. 1 an example of the computing device 106 displaying an example of the user interface 124 via a display device, e.g., a touchscreen.

Here, the user interface 124 includes a glucose graph 402, which plots one or more of the glucose measurements 114 (e.g., of the person 102) over time. In the illustrated example 400, the time period over which the plotted glucose measurements 114 are displayed in the glucose graph 402 is a 12-hour period. The user interface 124 also includes selectable elements that are selectable to display the glucose measurements 114 plotted over different time periods, including a 3-hour time period, a 5-hour time period, and a 24-hour time period. It is to be appreciated that the glucose monitoring application 116 may plot the glucose measurements 114 on the glucose graph 402 over different periods of time without departing from the spirit or scope of the techniques described herein. In one or more implementations, though, these time periods correspond to time periods that precede a current time, e.g., to enable a user to review patterns in their glucose that lead up to a current glucose value.

In some cases, however, users may be confused about what the glucose measurements 114 plotted over time mean. Consequently, those users may be unable to draw insights from the data and thus are unable to affect their behavior according to glucose insights to achieve health goals, e.g., glucose-based goals. In other words, glucose graphs that plot glucose measurements 114 over time can be difficult to understand and comprehend for some users. Even for users that are capable of determining some insight from the glucose graph 402, determining such an insight from the glucose graph 402 can be laborious because it may require switching to a different user interface, or providing user input in relation to individual measurement representations on the graph, to view individual values for each of a plurality of glucose measurements 114. Determining such an insight from the glucose graph 402 alone may also require a user to already know or make a guess regarding various parameters required to make an accurate insight, for example, the user may need to know or make a guess at upper and lower values of a glucose range. Making such a guess may be impractical though, such as when a glucose range changes throughout the course of a day.

Regardless, the glucose graph 402 may present too much information for some users (e.g., new users) before those users understand what the patterns in the glucose graph mean for their wellness. As a result, presenting the glucose graph 402 can overwhelm and frustrate users, causing them to stop using glucose monitoring applications. Doing so can prevent users from recognizing the health benefits obtained from utilizing glucose monitoring applications and thus results in further degradation of user health. In contrast with presentation of a glucose graph, consider the following discussion of a user interface that presents a visual element representative of a determined glucose insight.

Figure 5:
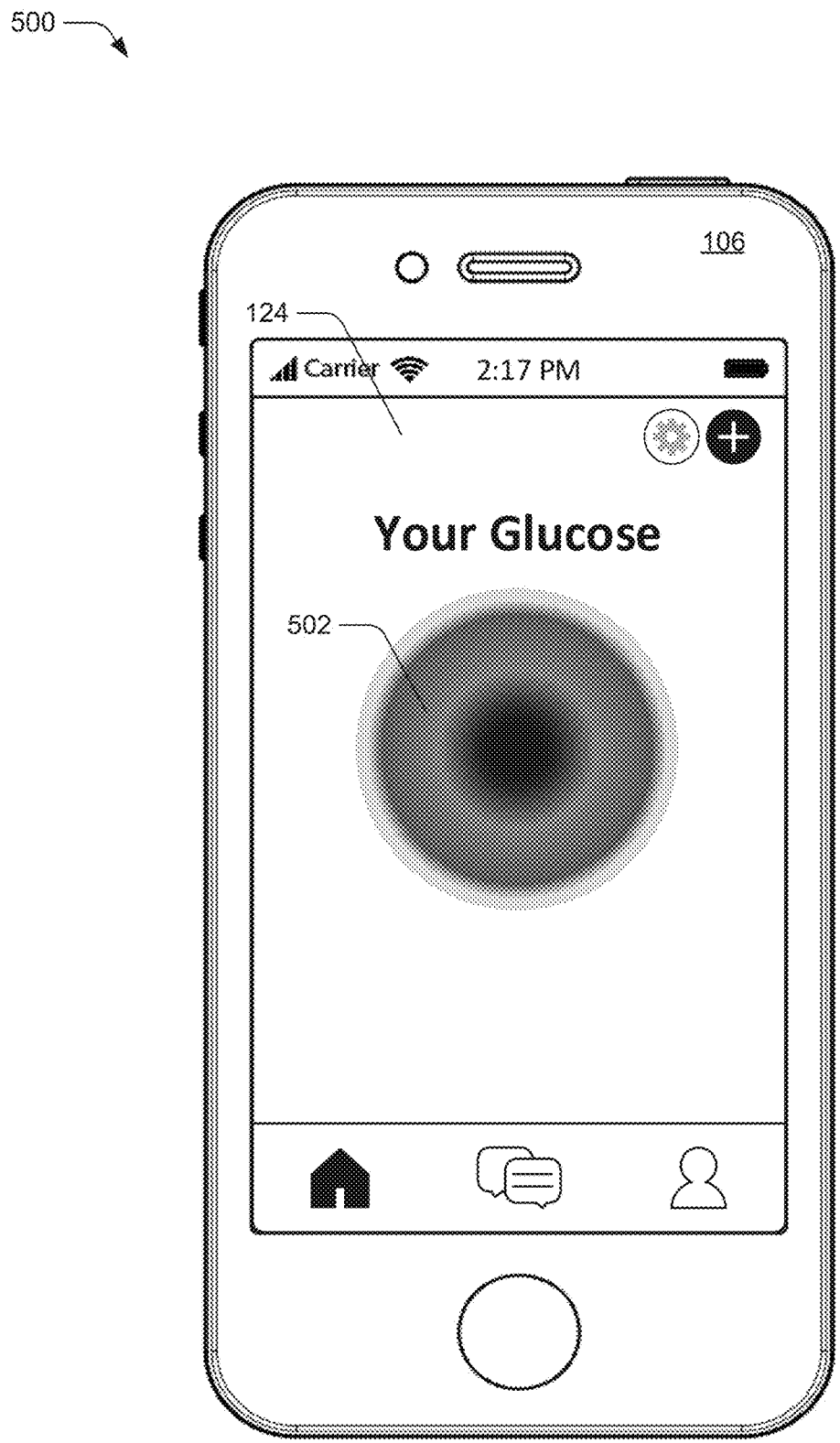
FIG. 5 depicts an example of an implementation of a user interface displaying a visual element representative of a glucose insight determined for a user.

FIG. 5 depicts an example 500 of an implementation of a user interface displaying a visual element representative of a glucose insight determined for a user.

Like the illustrated example 400, the illustrated example 500 includes from FIG. 1 an example of the computing device 106 displaying an example of the user interface 124 via a display device, e.g., a touchscreen. In contrast to the example 400, though, the user interface 124 depicted in the illustrated example 500 does not include a glucose graph. Instead, the user interface 124 includes visual element 502 in this example 500, e.g., without display of a glucose graph and without display of a number corresponding to current glucose of the user.

In this example 500, the visual element 502 is representative of a glucose insight determined for a user, e.g., the person 102. In the context of FIG. 3, the glucose insight engine 302 determines a glucose insight and the user interface configuration module 120 configures the user interface 124 to include the visual element 502. The user interface configuration module 120 may configure the user interface 124, at least in part, by referencing or otherwise processing the configuration data 122 to determine the visual element 502, e.g., the configuration data 122 may specify which visual element to display based on the determined glucose insight.

In one or more implementations, the visual element 502 corresponds to a color field, which may be configured with different colors depending on a glucose insight determined. For example, the user interface configuration module 120 may configure the user interface 124 to include the color field with a first color responsive to determination of a first glucose insight, with a second color responsive to determination of a second glucose insight, with a third color responsive to determination of a third glucose insight, and so on. Specifically, the user interface configuration module 120 may configure the user interface 124 to include the color field with a first color (e.g., orange) responsive to a determination that the person 102's most recent glucose measurement 114 is above a desired glucose range (e.g., above a range of 70-180 mg/dL), to include the color field with a second color (e.g., green) responsive to a determination that the person 102's most recent glucose measurement is within the desired range (e.g., between the range of 70-180 mg/dL), and to include the color field with a third color (e.g., red or yellow) responsive to a determination that the person 102's most recent glucose measurement 114 is below a desired glucose range (e.g., above a range of 70-180 mg/dL).

It is to be appreciated that the above noted example is merely one example of how a color field may be used and that a visual element corresponding to a color of a color field may have any of a variety of colors to represent a variety of glucose insights in accordance with the described techniques. For example, a color with which a color field is configured may correspond to variability of the person 102's glucose measurements, such that when the glucose insight engine 302 determines the variability is low, the user interface configuration module 120 configures the user interface 124 to include a color field having a color that corresponds to a positive insight (e.g., green), and such that when the glucose insight engine 302 determines the variability is high, the user interface configuration module 120 configures the user interface 124 to include a color field having a color (e.g., red or orange) that corresponds to a negative insight or an insight about which the user should be cautious. Indeed, different the user interface may be configured with a color field having different colors to represent different insights without departing from the spirit or scope of the described techniques.

Alternatively or additionally, one or more color fields may be capable of having a gradient fill, such that the color field is fillable with gradient colors from an empty (or low fill) state to a full (or nearly full) state. In one or more implementations, the gradient colors may become more saturated from the empty to the full state (e.g., from light green to dark green) or the gradient colors may become less saturated from the empty to the full state (e.g., from dark red to light red). Alternatively or additionally, the gradient may have a spectrum of different colors, e.g., green, yellow, red, and blend between them, such that the color field is fillable from a color at one end of the spectrum (e.g., green) through any middle colors in the spectrum (e.g., yellow) to a color at another end of the spectrum (e.g., red). The colors at one end of the spectrum may represent determination of glucose insights that are generally positive (e.g., within a desired range, low variability, trending toward a desired range, etc.) in terms of a person's health while colors at the other end of the spectrum may represent determination of glucose insights that are generally negative in terms of the (e.g., outside the desired range, high variability, trending away from the desired range, etc.) person's health.

Regardless, by displaying the visual element 502, the user interface 124 provides information that a user can easily understand with just a quick glance. When the visual element 502 has a color indicating that the user's most recent glucose measurement is within a desired range, for example, the user is able to comprehend this insight from the user interface 124 with just a quick glance. This contrasts with having to focus on a glucose graph, locate a representation of a most recent glucose measurement, and determine whether a location of the representation is within a region of the graph that corresponds to the desired range. Configuring a user interface with visual elements to represent glucose insights can be particularly advantageous with mobile devices, such as smart watches, which may have limited screen space for displaying information and also may limit inputs for obtaining detailed information. Instead, in accordance with the described techniques, the user interface configuration module 120 may configure a user interface for display via a smart watch that includes the visual element 502 (e.g., a color field), such that a user may be able to rotate her or his wrist to simply glance at the display of the smart watch and comprehend the glucose insight represented by the displayed visual element 502. Although configuring the user interface 124 with a single visual element 502 representative of a single glucose insight is discussed above and below, it is to be appreciated that the user interface 124 may be configured with more information and/or more visual elements than just a single visual element, in one or more implementations. In this context, consider the following discussion of FIG. 6.

Figure 6:
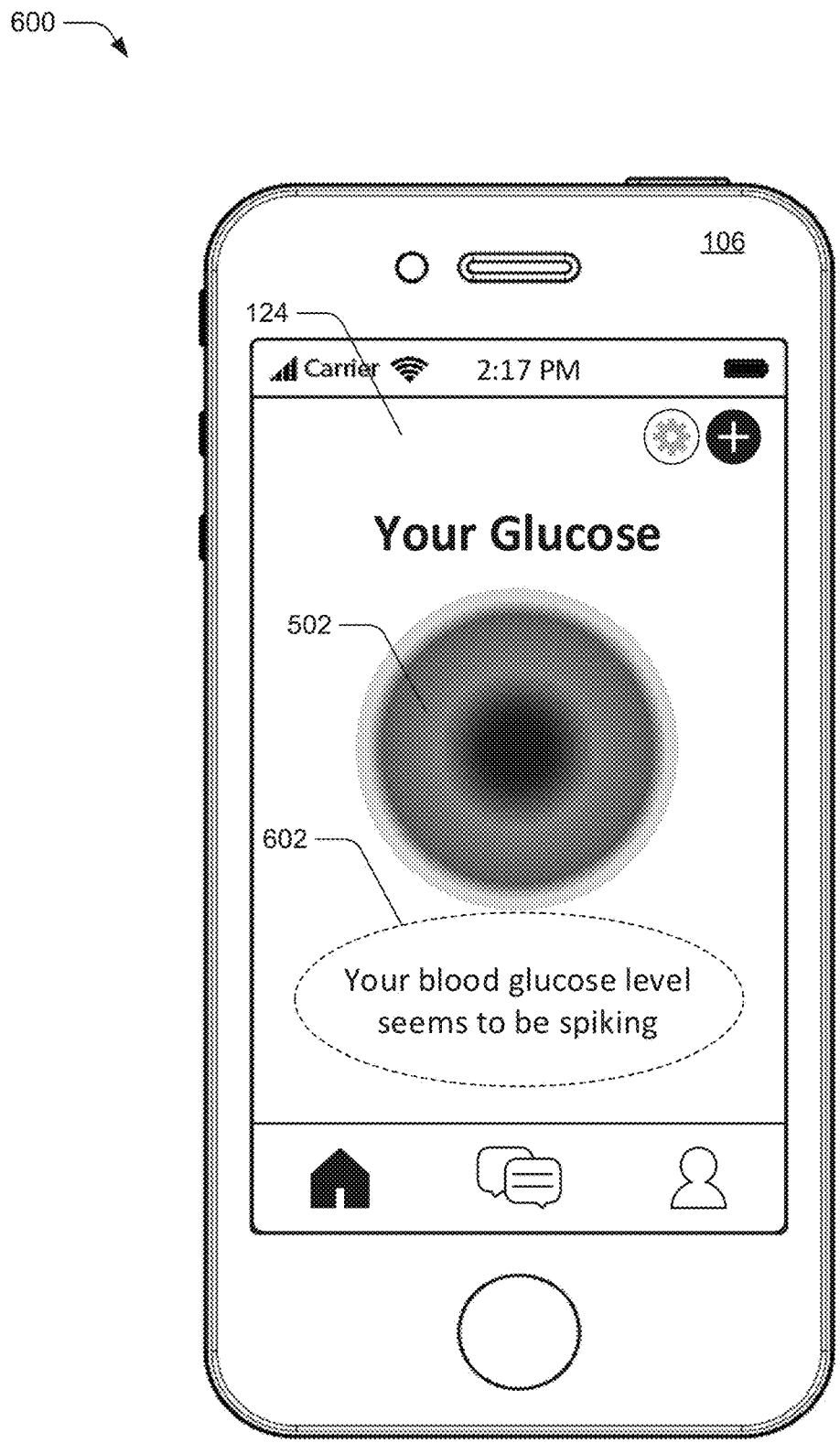
FIG. 6 depicts an example of an implementation of a user interface displaying the visual element representative of the glucose insight determined for a user and displaying information that supplements the glucose insight.

FIG. 6 depicts an example 600 of an implementation of a user interface displaying the visual element representative of the glucose insight determined for a user and displaying information that supplements the glucose insight.

Like the illustrated example 500, the illustrated example 500 includes from FIG. 1 an example of the computing device 106 displaying an example of the user interface 124 via a display device, e.g., a touchscreen. In the illustrated example 600, the user interface 124 also includes the visual element 502. While the user interface 124 does not include a glucose graph or a number corresponding to current glucose of the user, the user interface does include supplemental information 602.

In one or more implementations, the user interface configuration module 120 may configure a user interface to include supplemental information. The supplemental information with which a user interface is configured may depend on the glucose insight determined. Moreover, which supplemental information and whether supplemental information is displayed may be controlled by the configuration data 122. Broadly speaking, the supplemental information 602 supplements the visual element 502 or explains the visual element 502. In terms of explaining the visual element 502, the supplemental information 602 may provide information (e.g., text) that informs a user why the visual element 502 is included in the user interface 124. For instance, the supplemental information 602 may provide a textual description of the determined glucose insight. It is to be appreciated that such a textual description may range in detail from a general explanation of the insight to a more detailed description that includes numbers, how the numbers compare to other numbers (e.g., thresholds), statistical measures derived to determine the glucose insight (e.g., averages, standard deviation, etc.), and so forth. Alternatively or additionally, the supplemental information 602 may simply be related to the a glucose of the user without being specific to the visual element 502, e.g., the supplemental information 602 may comprise encouragement or a warning, a reminder, an indication that a goal was met, and so forth. The user interface configuration module 120 may configure the user interface 124 with a variety of supplemental information without departing from the spirit or scope of the described techniques. As noted above, the user interface configuration module 120 may alternatively or additionally configure user interfaces with more than one visual element to represent more than one glucose insight. In this context, consider the following discussion of FIG. 7.

Figure 7:
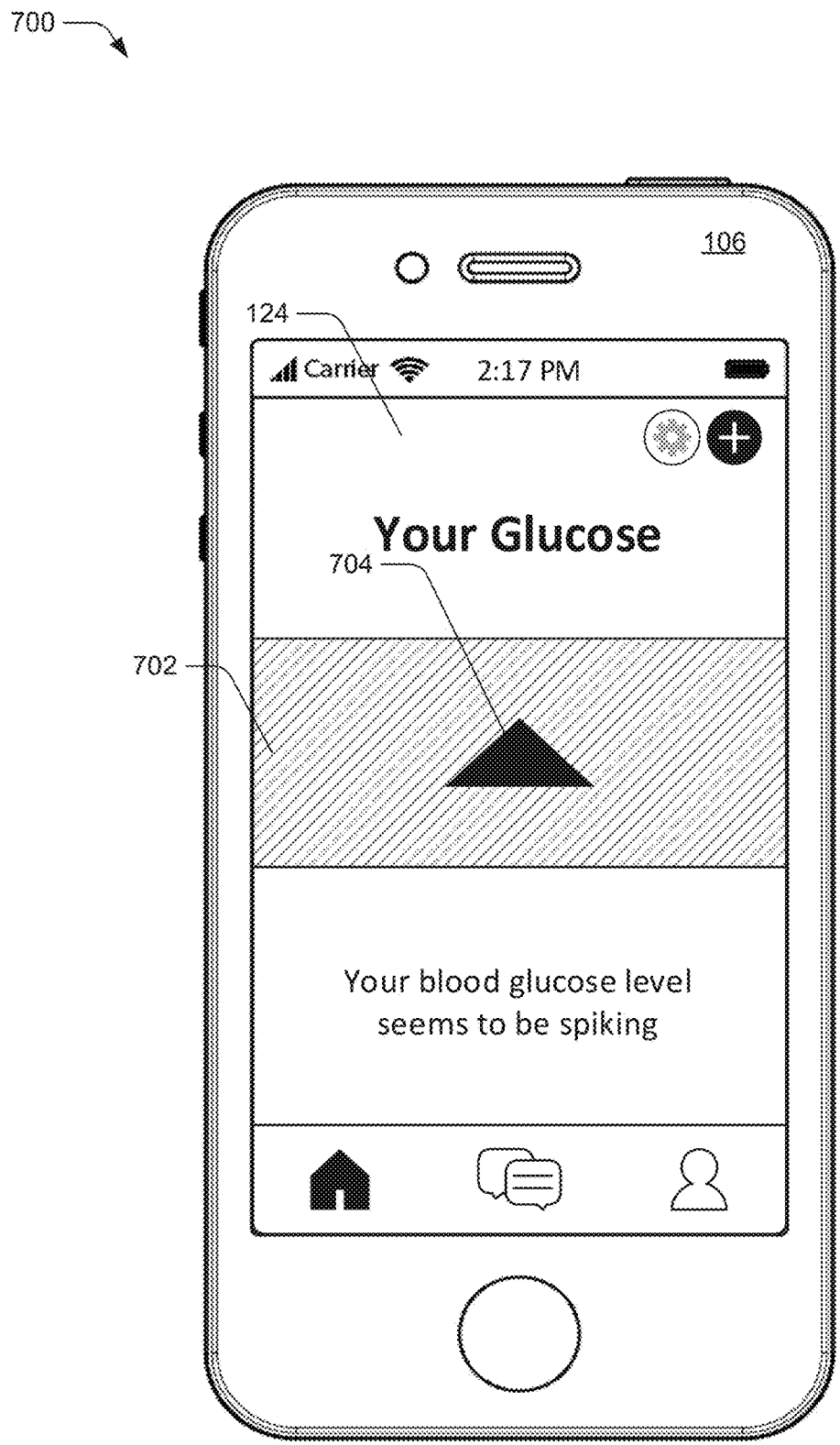
FIG. 7 depicts an example of an implementation of a user interface displaying a first visual element representative of a first glucose insight and also displaying a second visual element representative of a second glucose insight.

FIG. 7 depicts an example 700 of an implementation of a user interface displaying a first visual element representative of a first glucose insight and also displaying a second visual element representative of a second glucose insight. The illustrated example 700 includes from FIG. 1 an example of the computing device 106 displaying an example of the user interface 124 via a display device, e.g., a touchscreen.

Here, the user interface 124 includes a first visual element 702 and a second visual element 704. In accordance with the described techniques, the user interface configuration module 120 configures the user interface 124 in this example 700 with the first visual element 702 based on determination of a first glucose insight, e.g., by the glucose insight engine 302. The user interface configuration module 120 also configures the user interface 124 in this example 700 with the second visual element 704 based on determination of a second glucose insight, e.g., by the glucose insight engine 302. Accordingly, the first and second visual elements 702, 704 represent different glucose insights and are displayed concurrently. Multiple visual elements with which a user interface may be configured for concurrent display may represent a variety combinations of different glucose insights without departing from the spirt or scope of the described techniques.

In the illustrated example 700, for example, the first visual element 702 may correspond to a color field that represents a glucose insight such as how the user's current glucose compares to a glucose range. For example, responsive to the glucose insight engine 302 determining that the user's current glucose is above the glucose range (e.g., a first insight), then the user interface configuration module 120 configures the first visual element 702 as the color field having a respective color (e.g., orange due to being above the glucose range). In contrast, the second visual element 704 may correspond to a shape that represents a glucose insight such as a trend of the glucose measurements over time or a rate of change of the glucose measurements over a time period. For example, responsive to the glucose insight engine 302 determining that the user's glucose has been increasing over time or is increasing over time but slowly (e.g., a second insight), then the user interface configuration module 120 configures the second visual element 704 to have a particular shape that corresponds to the insight (e.g., an upward pointing triangle or arrow representing an increase in glucose measurements or a single upward point triangle representing an increase, but a relatively slow increase). It is to be appreciated that a first and second visual element may be configured differently than a color field and a shape and/or may represent different first and second glucose insights in the spirit of the described techniques. In the context of using a second visual element that is different from the second visual element 704, and thus represents a different glucose insight than the second visual element 704, consider the following discussion of FIG. 8.

Figure 8:
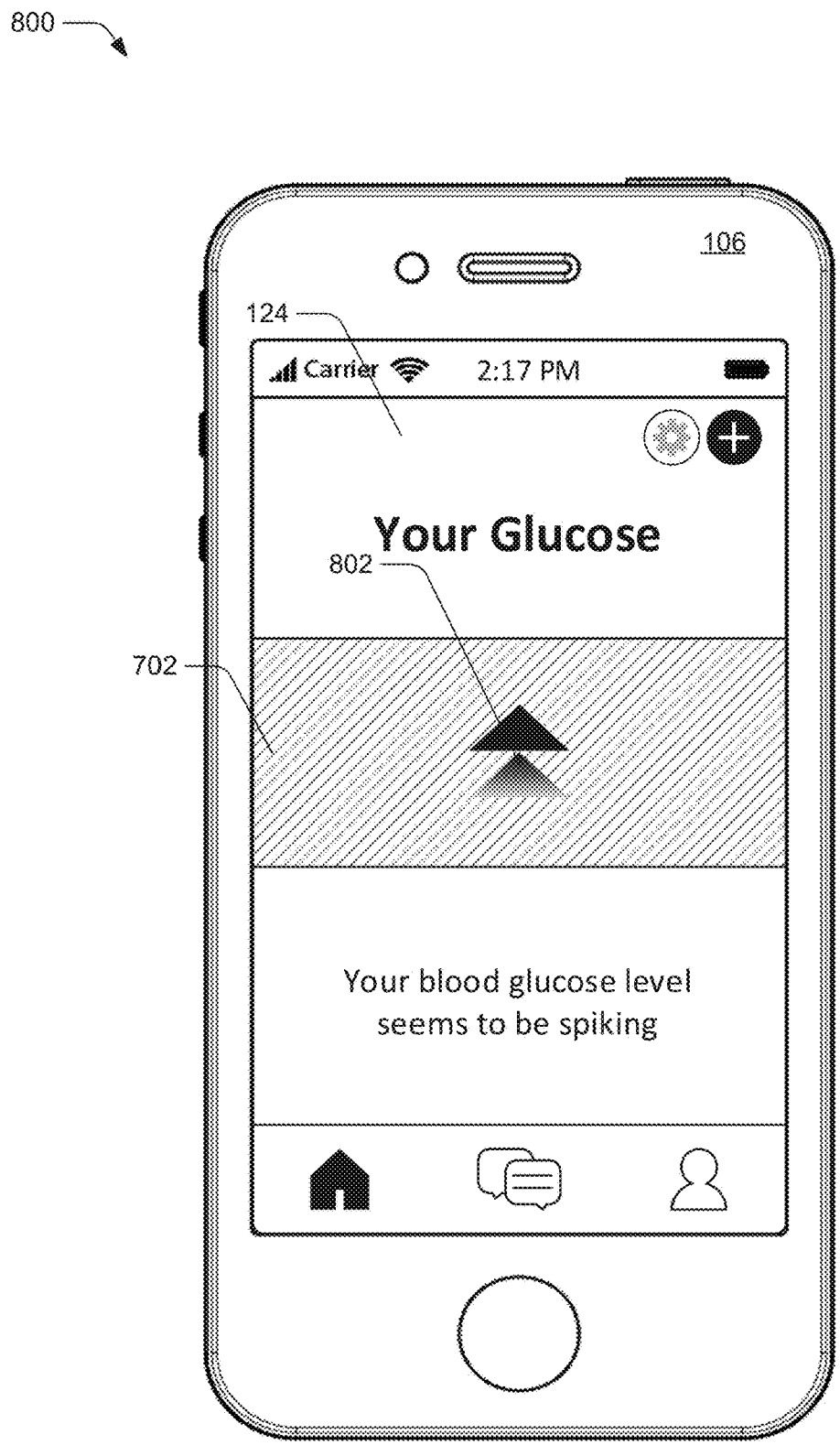
FIG. 8 depicts another example of an implementation of the user interface displaying the first visual element representative of the first glucose insight and a second visual element that is different from the second visual element of FIG. 7 and is representative of a different glucose insight.

FIG. 8 depicts another example 800 of an implementation of the user interface displaying the first visual element representative of the first glucose insight and a second visual element that is different from the second visual element of FIG. 7 and is representative of a different glucose insight.

Like the illustrated example 700, the illustrated example 800 includes from FIG. 1 an example of the computing device 106 displaying an example of the user interface 124 via a display device, e.g., a touchscreen. In the illustrated example 800, the user interface 124 also includes the first visual element 702, e.g., a color field with a color corresponding to a first glucose insight. In contrast to the illustrated example 700, though, the user interface 124 does not include the second visual element 704, and instead includes a different second visual element 802.

In accordance with the described techniques, the user interface configuration module 120 configures the user interface 124 in this example 800 with the different second visual element 802 based on determination of a second glucose insight that is different from the second glucose insight determined in relation to FIG. 7. Responsive to obtaining a different second glucose insight, the user interface configuration module 120 configures the user interface 124 with the different second visual element 802 that is different from the second visual element 704. In the illustrated example, the different second visual element 802 corresponds to a different shape than the second visual element 704—the different second visual element 802 is multiple stacked triangles whereas the second visual element 704 is a single triangle. Given this, the shape of the different second visual element 802 represents a different glucose insight from the shape of the second visual element 704. It is to be appreciated that visual elements may have a various shapes to represent different glucose insights without departing from the spirit or scope of the described techniques.

In one example, for instance, the second visual element 704 may represent a glucose insight about a rate of change of glucose measurements, as discussed above. In the illustrated example 700, the second visual element 704 (a single upward pointing triangle or arrow) may represent a glucose insight that the person 102's glucose is determined to be increasing but relatively slowly, e.g., a low rate of change. In contrast, the different second visual element 802 (double upward pointing triangles or arrows) may represent a glucose insight that the person 102's glucose is determined to be increasing but relatively faster than the rate determined in relation to the example 700, e.g., a moderate rate of change. The user interface configuration module 120 may configure the user interface 124 with one or more downward pointing triangles or arrows to represent decreases in some value, e.g., a downward trend in glucose measurements where more downward pointing arrows or triangles corresponds to a greater rate of decrease than fewer arrows or triangles. Moreover, different shapes may be used to represent that the glucose measurements of the person 102 are substantially the same or similar over a time period, e.g., the glucose insight engine 302 does not determine an increasing or decreasing trend in the person 102's glucose. Indeed, a glucose insight may be represented by a variety of shapes in accordance with the described techniques.

Figure 9:
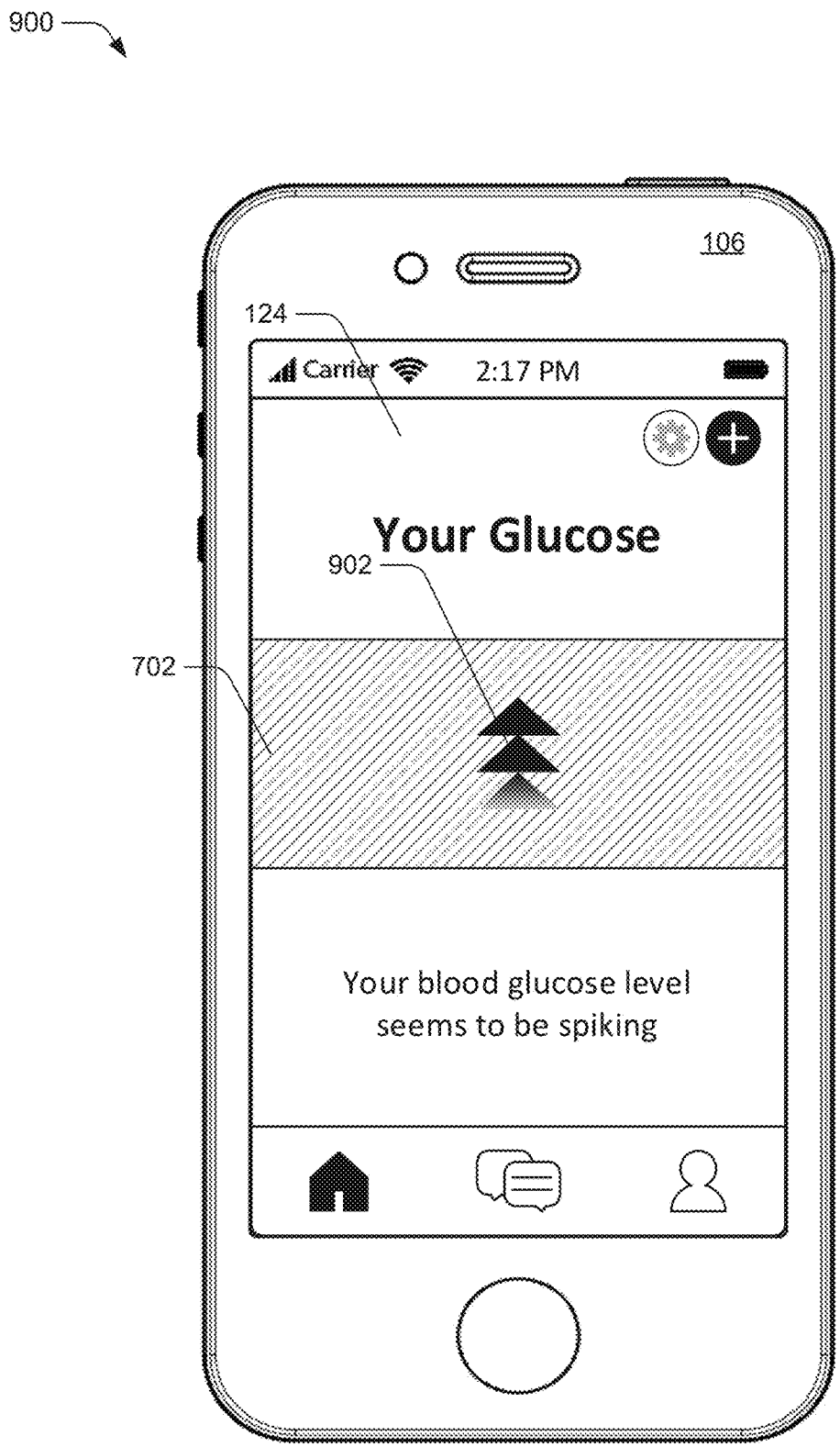
FIG. 9 depicts another example of an implementation of the user interface displaying the first visual element representative of the first glucose insight and a second visual element that is different from the second visual elements of FIGS. 7 and 8 and is representative of another different glucose insight.

FIG. 9 depicts another example 900 of an implementation of the user interface displaying the first visual element representative of the first glucose insight and a second visual element that is different from the second visual elements of FIGS. 7 and 8 and is representative of another different glucose insight.

Like the illustrated examples 700, 800, the illustrated example 900 includes from FIG. 1 an example of the computing device 106 displaying an example of the user interface 124 via a display device, e.g., a touchscreen. In the illustrated example 900, the user interface 124 also includes the first visual element 702, e.g., a color field with a color corresponding to a first glucose insight. In the illustrated example 900, the user interface 124 does not include the second visual element 704 or the different second visual element 802. Instead, the user interface 124 depicted in the example 900 includes a second visual element 902 that is different from the second visual element 704 and the different second visual element 802.

In accordance with the described techniques, the user interface configuration module 120 configures the user interface 124 in this example 900 with the second visual element 902 based on determination of a second glucose insight that is different from the second glucose insights determined in relation to FIGS. 7 and 8. Responsive to obtaining this second glucose insight that is different from the second insights determined in relation to FIGS. 7 and 8, the user interface configuration module 120 configures the user interface 124 with the second visual element 902 that is different from the second visual element 704 and the different second visual element 802. In the illustrated example, the second visual element 902 corresponds to a different shape than the second visual element 704 and the different second visual element 802—the second visual element 902 is a greater number of stacked triangles (i.e., 3 triangles) than the different second visual element 802 (i.e., 2 triangles) and the second visual element 704 (i.e., a single triangle). Given this, the shape of the second visual element 902 represents a different glucose insight from the insights represented by the shapes of the second visual element 704 and the different second visual element 802.

As mentioned above, for instance, the second visual element 704 may represent a glucose insight about a rate of change of glucose measurements. The second visual element 704 (a single upward pointing triangle or arrow) may represent a glucose insight that the person 102's glucose is determined to be increasing, but relatively slowly, e.g., a low rate of change. The different second visual element 802 (double upward pointing triangles or arrows) may represent a glucose insight that the person 102's glucose is determined to be increasing, but relatively faster than the rate determined in relation to the example 700, e.g., a moderate rate of change. In contrast, the second visual element 902 (triple upward pointing triangles or arrows) may represent a glucose insight that the person 102's glucose is determined to be increasing, but relatively faster than the rates determined in relation to the examples 700 and 800, e.g., a relatively higher rate of change. In addition to different shapes, the user interface configuration module 120 may alternately or additionally configure the user interface 124 to include different numbers of same or different shapes to represent various glucose insights in accordance with the described techniques.

Figure 10:
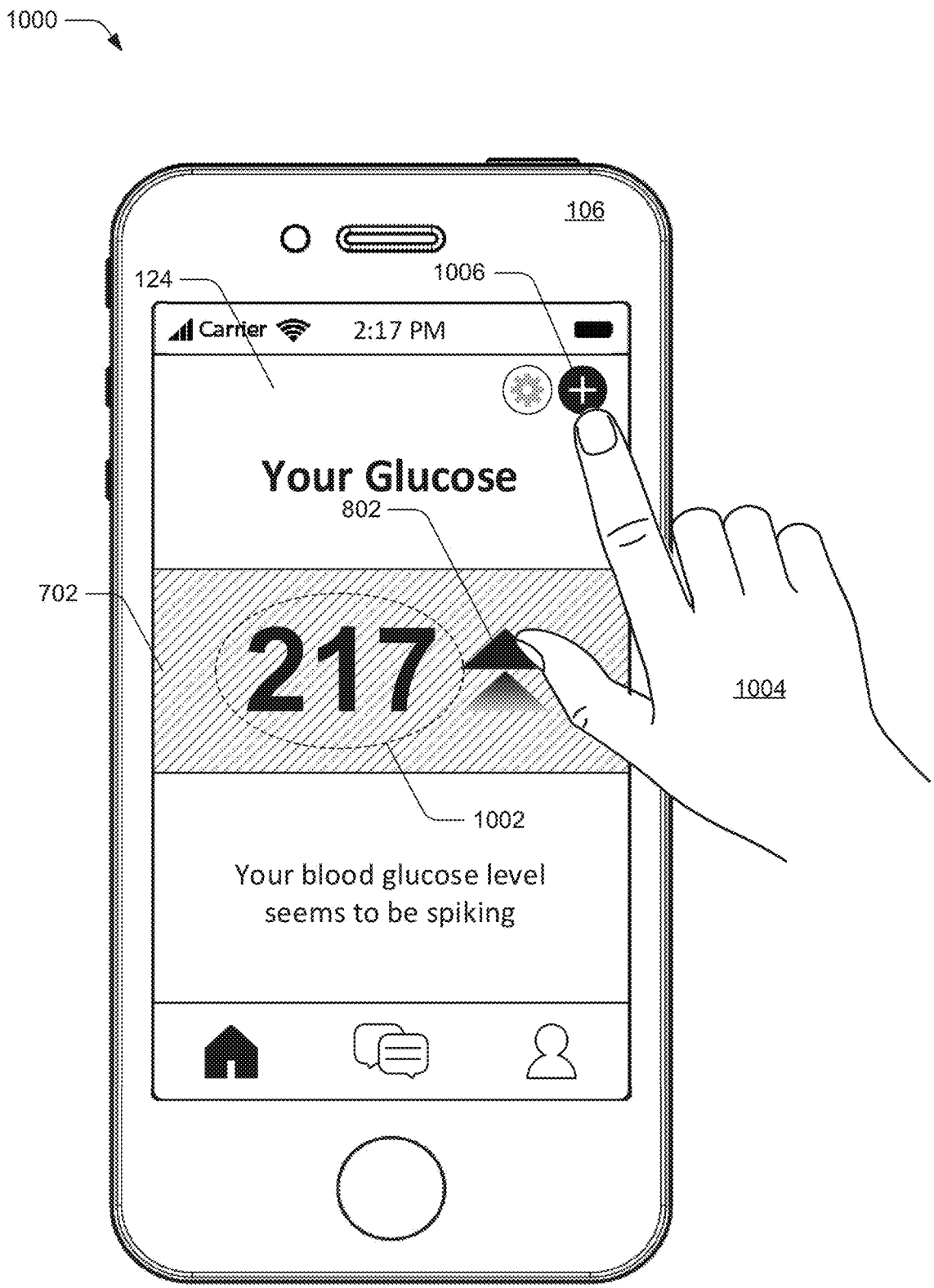
FIG. 10 depicts an example of an implementation of a user interface displaying first and second visual elements representative of first and second glucose insights, respectively, and also displaying a glucose number.

FIG. 10 depicts an example 1000 of an implementation of a user interface displaying first and second visual elements representative of first and second glucose insights, respectively, and also displaying a glucose number. The illustrated example 1000 includes from FIG. 1 an example of the computing device 106 displaying an example of the user interface 124 via a display device, e.g., a touch screen.

Here, the user interface 124 includes the first visual element 702 (e.g., a color field with a color corresponding to a first glucose insight) and the different second visual element 802 (e.g., one or more shapes corresponding to a second glucose insight). In contrast to FIGS. 5-9, though, the user interface 124 in this example 1000 also includes glucose number 1002. The glucose number 1002 may correspond to a "current" glucose measurement of a user, e.g., the most recent glucose measurement 114 produced by and obtained from a glucose monitoring system. It is to be appreciated that in one or more scenarios the user interface configuration module 120 may configure the user interface 124 to include the glucose number 1002 while in other scenarios the user interface configuration module 120 may prevent display of the glucose number 1002. The display or non-display of the glucose number 1002 may be controlled, at least in part, by the configuration data 122.

As mentioned above, for instance, the configuration data 122 may define a progression of insights for presentation to a user over time. In one or more implementations, this may include initially configuring the user interface 124 with one or more glucose insights for display during a stage (e.g., a first stage) of the progression. During this stage, the configuration data 122 may also prevent the user interface 124 from being configured with a glucose number, such that the glucose number 1002 is not displayed during this stage. In a subsequent stage (e.g., a second, third, or fourth stage, to name a few), the configuration data 122 may allow progressive configurations that do not prevent the user interface 124 from being configured with a glucose number 1002 for display. Instead, at this subsequent stage the user interface 124 may be configured a glucose number, such that the one or more glucose insights displayed during the stage (e.g., the first stage) may be displayed concurrently with the glucose number 1002 via the user interface 124 during the subsequent stage.

By progressively revealing additional or different information—including additional or different visual elements as well as other graphical element (e.g., the glucose number 1002 or a glucose graph)—the glucose monitoring application 116 may educate users about their glucose in a stepwise, easy-to-understand fashion. As a result of educating users through the progressive reveal of information, the glucose monitoring application 116 may further prevent users from being overwhelmed or confused by the information presented. Moreover, users that are not overwhelmed or confused by the presentation of information may continue using the glucose monitoring application 116, and, due to the continued use, recognize the health benefits obtained from utilizing glucose monitoring applications as well as achieve improved glucose control.

Alternatively or additionally, the user interface 124 may be configured with the glucose number 1002 according to user preferences, e.g., that are captured in the configuration data 122. For example, the glucose monitoring application 116 may include a user interface instrumentality in relation to which a user can provide input to toggle display of the glucose number 1002 on or off. To represent the capability of the glucose monitoring application 116 to receive input from a user to select to display or not various visual elements (e.g., representative of glucose insights) or various graphical elements, the illustrated example 1000 also includes a hand 1004 of a user. Here, the hand 1004 is depicted selecting (e.g., with touch or a gesture) interface instrumentality 1006. Generally, receiving a selection via the interface instrumentality 1006 represents functionality to enable a user to provide input to toggle between displaying one or more visual elements (or other graphical elements) and not displaying them. By way of example, and not limitation, a user may select the interface instrumentality 1006 to add to (or remove from) the user interface 124 for display one or more of a glucose number, a glucose graph, supplemental information, or any of a plurality of visual elements that correspond to glucose insights. Regardless of whether based on a user selection (e.g., via the interface instrumentality) or based on a progressive reveal of information, in one or more implementations the user interface 124 may be configured to display a glucose graph along with one or more visual elements representative of respective glucose insights. In this context, consider the following discussion of FIG. 11.

Figure 11:
FIG. 11 depicts an example of an implementation of a user interface displaying first and second visual elements representative of first and second glucose insights, respectively, and also displaying a glucose number and a glucose graph that plots values of glucose measurements of a user over time.

FIG. 11 depicts an example 1100 of an implementation of a user interface displaying first and second visual elements representative of first and second glucose insights, respectively, and also displaying a glucose number and a glucose graph that plots values of glucose measurements of a user over time.

Like the illustrated example 1000, the illustrated example 1100 includes from FIG. 1 an example of the computing device 106 displaying an example of the user interface 124 via a display device, e.g., a touchscreen. In the illustrated example 1100, the user interface 124 includes the first visual element 702, the different second visual element 802, and the glucose number 1002. In contrast to the illustrated example 1000, though, the user interface 124 further includes the glucose graph 1102.

In accordance with the described techniques, the user interface configuration module 120 configures the user interface 124 in this example 1100 with the glucose graph 1102 based on the configuration data 122, e.g., where the configuration data 122 includes user preferences to affirmatively display the glucose graph 1102 or rules of a progression allow display of the glucose graph 1102 at a current stage. In a similar manner as the glucose number 1002, the configuration data 122 may define a progression of insights for presentation to a user over time. In one or more implementations, this may include initially configuring the user interface 124 with one or more glucose insights for display during a stage (e.g., a first stage) of the progression. During this stage, the configuration data 122 may also prevent the user interface 124 from being configured with a glucose graph, such that the glucose graph 1102 is not displayed during this stage. In a subsequent stage (e.g., a second, third, or fourth stage, to name a few), the configuration data 122 may allow progressive configurations that do not prevent the user interface 124 from being configured with a glucose graph 1102 for display. Instead, at this subsequent stage the user interface 124 may be configured a glucose graph, such that the one or more glucose insights displayed during the stage (e.g., the first stage) may be displayed concurrently with the glucose graph 1102 via the user interface 124 during the subsequent stage. Progressively revealing a glucose graph in this way may have similar advantages to progressively revealing a glucose number, which are discussed in more detail above.

In one or more implementations, the user interface configuration module 120 may configure the glucose graph 1102 in a way that visually emphasizes a desired range, e.g., a "healthy" glucose range. As discussed above, this range may vary for a variety of reasons, and be dynamically changed (e.g., by the glucose monitoring application) or set based on user or health care provider input. The range may also vary depending on a time, such as a time of day. Regardless, to visually emphasize the range, the user interface configuration module 120 may configure the glucose graph 1102 to include an in-range region 1104 that is visually emphasized. The in-range region 1104 may be visually emphasized by having a different color than other regions of the glucose graph 1102. For example, the user interface configuration module 120 may configure the in-range region 1104 to have a visually pleasing color (e.g., green), which may be user selected or predetermined to indicate that having glucose measurements 114 within the range is a positive health outcome. By coloring the in-range region 1104 differently than other regions of the glucose graph 1102 the user interface configuration module 120 enables a user to quickly glance at the user interface 124 to determine whether the representations of her or his glucose measurements 114 are within the desired range.

Figure 12:
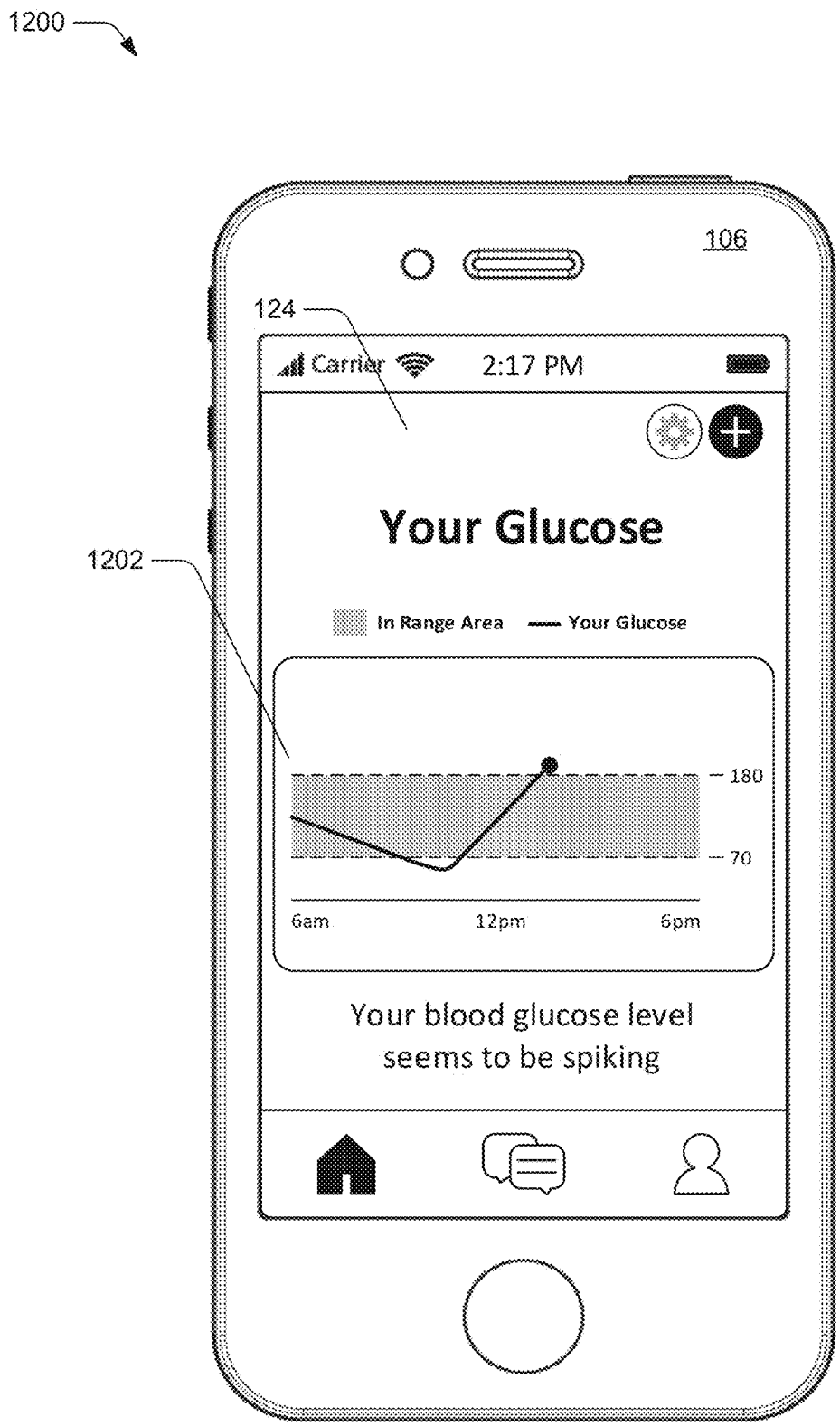
FIG. 12 depicts another example of an implementation of a user interface displaying a visual element representative of a glucose insight determined for a user.

FIG. 12 depicts another example 1200 of an implementation of a user interface displaying a visual element representative of a glucose insight determined for a user.

The illustrated example 1200 includes from FIG. 1 an example of the computing device 106 displaying an example of the user interface 124 via a display device, e.g., a touch screen. Here, the user interface includes one or more visual elements 1202. In accordance with the described techniques, the user interface configuration module 120 configures the user interface 124 in this example 1200 with the one or more visual elements 1202 based on a determination of one or more glucose insights. By way of example, the glucose insight engine 302 may determine a decreasing trend of the glucose measurements 114 that is followed by an increasing trend of the glucose measurements 114 of a user over time. Responsive to the determination of these glucose insights as trends, the user interface configuration module 120 may configure the user interface 124 to include the one or more visual elements 1202 having a trend line. Presentation of a trend line over time contrasts with plotting glucose measurements because the trend line does not show a representation of each measurement at an associated time (or a line passing substantially through the value of each measurement at the associated time). Instead, the trend line shows general trends of glucose measurements over time, such as substantially increasing or substantially decreasing. Notably, the one or more visual elements 1202 with the trend line limit the number of labels of glucose values. Here, the labels are limited to a value that corresponds to an upper threshold of a desirable range (e.g., 180 mg/dL) and a lower threshold of the desirable range (e.g., 70 mg/dL). While these labels are depicted in the illustrated example 1200, in at least one implementation a trend graph may be presented via the user interface 124 without any labels of glucose values. Here, the one or more visual elements 1202 also include an in-range region. By including the in-range region, the user interface 124 may visually indicate whether a user's glucose measurements are trending to stay within the corresponding desirable range, trending into the corresponding desirable range, or trending out of the desirable range. It is to be appreciated that various combinations of the above-discussed visual elements and other graphical elements may be included as part of the user interface 124 without departing from the spirit or scope of the described techniques.

Having discussed exemplary details of the techniques for user interfaces for glucose insight presentation, consider now some examples of procedures to illustrate additional aspects of the techniques.

EXAMPLE PROCEDURES

This section describes examples of procedures for user interfaces for glucose monitoring. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a glucose monitoring application, such as the glucose monitoring application 116 that makes use of the user interface configuration module 120.

Figure 13:
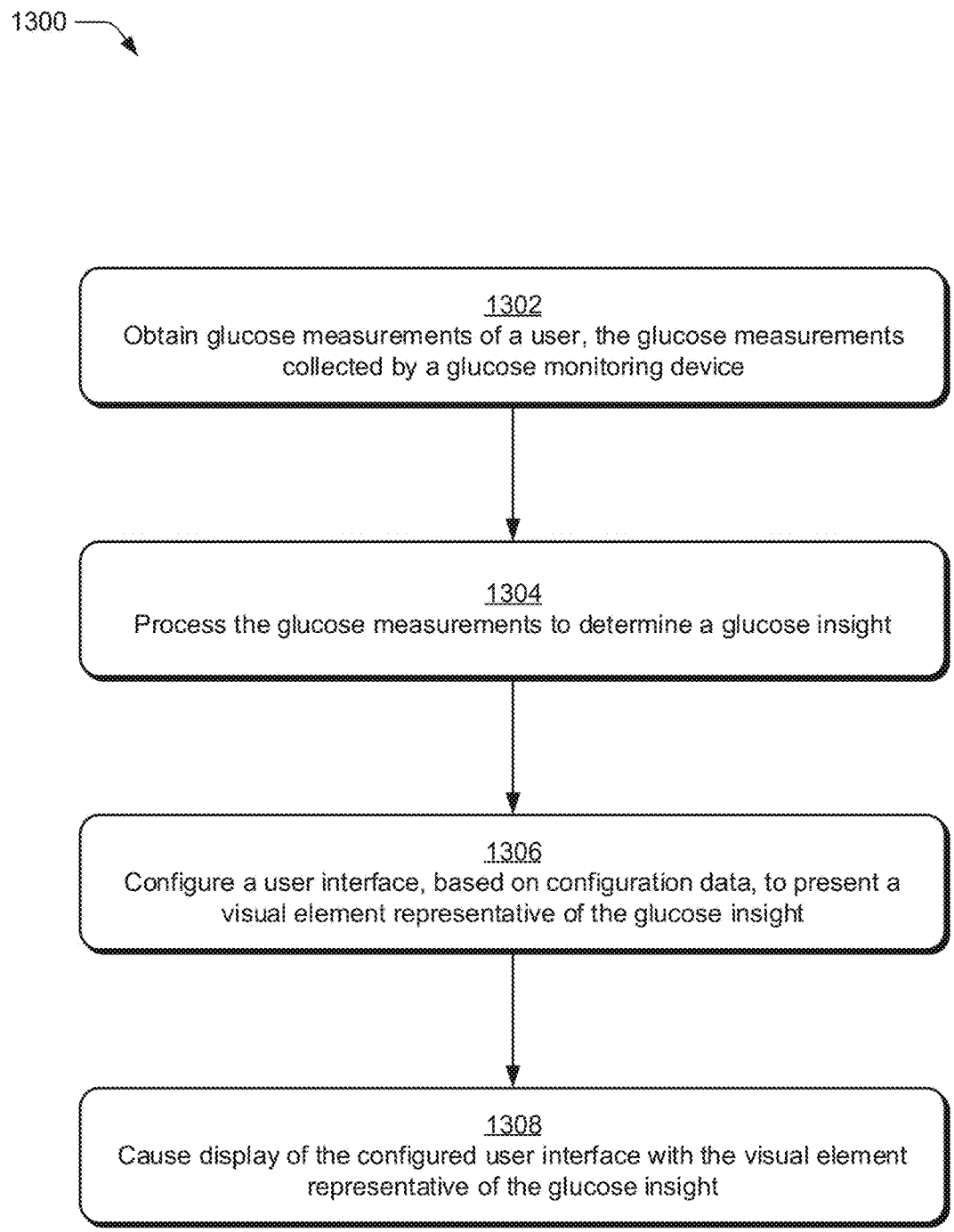
FIG. 13 depicts a procedure in an example of an implementation in which a user interface is configured, based on configuration data, to present a visual element representative of a glucose insight.

FIG. 13 depicts a procedure 1300 in an example of an implementation in which a user interface is configured, based on configuration data, to present a visual element representative of a glucose insight.

Glucose measurements of a user are obtained (block 1302). In accordance with the principles discussed herein, the glucose measurements are collected by a glucose monitoring device. By way of example, the glucose insight engine 302 obtains the glucose measurements 114 of the person 102 from the wearable glucose monitoring device 104.

The glucose measurements are processed to determine a glucose insight (block 1304). By way of example, the glucose insight engine 302 processes the glucose measurements 114 to determine one or more glucose insights 304, e.g., about the person 102's glucose. The glucose insight engine 302 may be configured to determine a variety of glucose insights 304 based on the glucose measurements 114. At a given time, for instance, the glucose insight engine 302 may determine a single glucose insight 304 or may determine a plurality of glucose insights 304. The glucose insights 304 may include, by way of example and not limitation, a current glucose measurement 114, how a current glucose measurement 114 compares to one or more other glucose measurements 114 for a same or similar time of day on different days, how one or more glucose measurements 114 compare to one or more other glucose measurements 114 for a same meal (e.g., breakfast, a snack, lunch, or dinner) on different days, whether the current glucose measurement 114 is below, within, or above a glucose range, a trend of the glucose measurements 114 over a time period (e.g., whether the glucose measurements are increasing in value, decreasing in value, or constant over the time period), a rate of change of the glucose measurements 114 over a time period (e.g., how quickly the glucose measurements are increasing or decreasing in value over the time period), a variability of the glucose measurements 114 over the time period, and how a variability of the glucose measurements 114 at a first time period (e.g., a "current" time period) compares to a variability of the glucose measurements 114 at one or more other time periods (e.g., one or more historical time periods), to name just a few.

As discussed throughout, the glucose insight engine 302 may not be limited to determining glucose insights based solely on the glucose measurements 114 of the person 102 and/or the glucose measurements 114 of other users of the user population 108. Instead, the glucose insight engine 302 may determine the glucose insight 304 further based on a variety of other data without departing from the spirit or scope of the described techniques. By way of example and not limitation, the glucose insight engine 302 may determine the glucose insight 304 based on data describing other physiological markers (e.g., heartrate, heartrate variability, breathing, rate of blood flow, and so on), fitness or activities (e.g., steps, activity type, performance, and so forth), health events, medication plans and/or medication taken, meals, stress, sleep, restorative events (e.g., meditation, massage), and so forth.

A user interface is configured, based on configuration data, to present a visual element representative of the glucose insight (block 1306). By way of example, the user interface configuration module 120 obtains the glucose insight 304 from the glucose insight engine 302. Then, based on the glucose insight 304, the user interface configuration module 120 configures a user interface and thus produces the configured user interface 124 with the selected visual element 306, e.g., which is indicative of the obtained glucose insight 304. Notably, the user interface configuration module 120 produces the configured user interface 124 in accordance with the configuration data 122. As discussed throughout, the configuration data 122 generally controls which glucose insights are presented to a particular user at a given time and how those insights are presented, e.g., which one or more visual elements are incorporated into the configured user interface 124 based on the one or more determined glucose insights 304.

The configured user interface with the visual element representative of the determined glucose insight is displayed (block 1308). By way of example, the glucose monitoring application 116 causes the configured user interface 124 with the visual element 306 representative of glucose insight 304 to be displayed by computing device 106.

Figure 14:
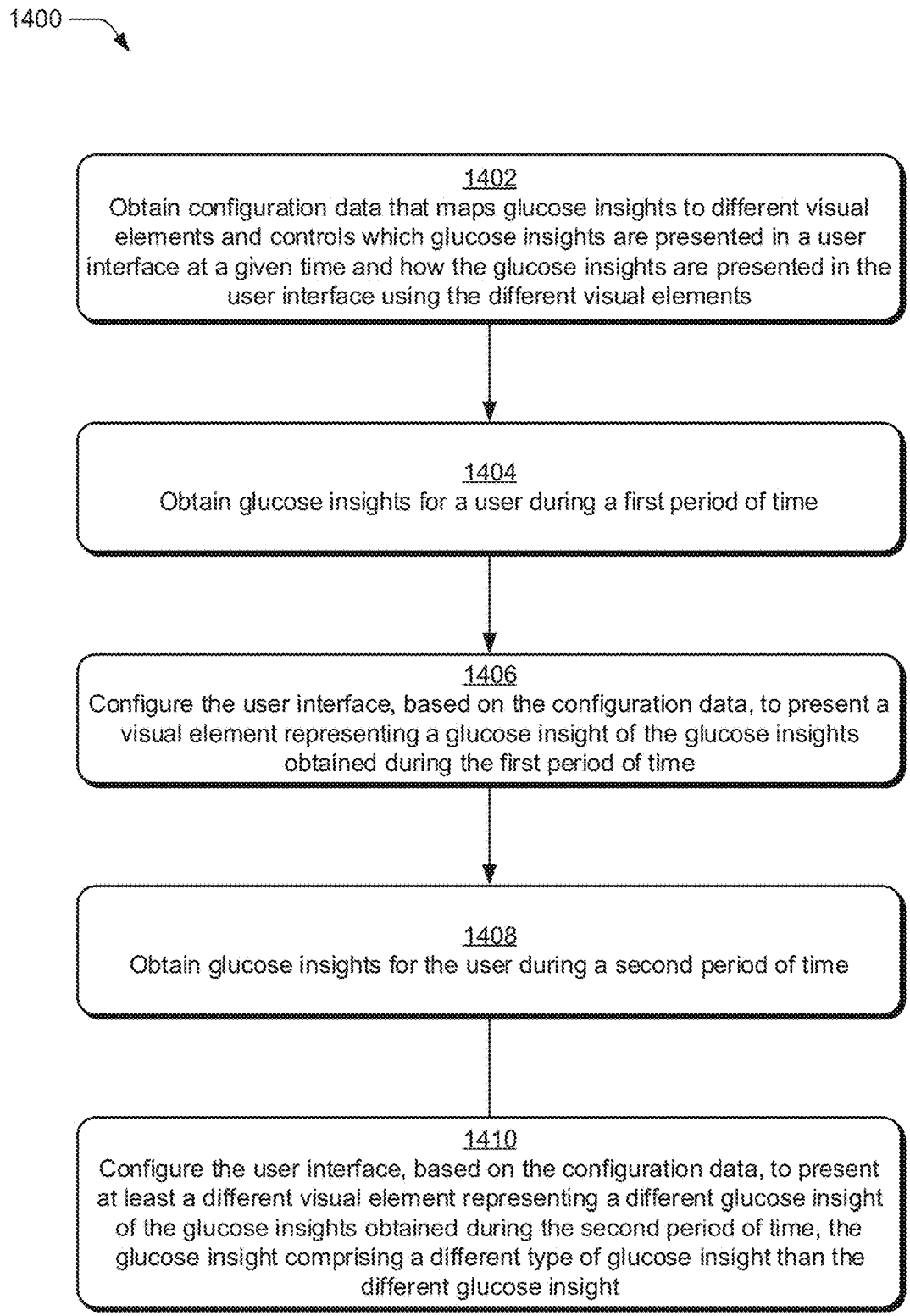
FIG. 14 depicts a procedure in another example of an implementation in which a user interface is configured, based on configuration data, to present visual elements representative of different glucose insights over time.

FIG. 14 depicts an additional procedure 1400 in an example of an implementation in which a user interface is configured, based on configuration data, to present visual elements representative of different glucose insights over time.

Configuration data is obtained (block 1402). In accordance with the principles discussed herein, the configuration data maps glucose insights to different visual elements and controls which glucose insights are presented in a user interface at a given time and how the glucose insights are presented in the user interface using the different visual elements. By way of example, the user interface configuration module 120 obtains configuration data 122. As discussed throughout, the configuration data 122 generally controls which glucose insights are presented to a particular user at a given time and how those insights are presented, e.g., which one or more visual elements are incorporated into the configured user interface 124 based on the one or more determined glucose insights 304.

Glucose insights are obtained for a user during a first period of time (block 1404), and the user interface is configured, based on the configuration data, to present a visual element representing a glucose insight of the glucose insights obtained during the first period of time (block 1406). By way of example, the glucose insight engine 302 processes glucose measurements 114 to determine one or more glucose insights 304, e.g., about the person 102's glucose. The user interface configuration module 120 then obtains the glucose insights 304 generated by the glucose insight engine 302 during a first period of time. The first period of time, for example, may correspond to glucose insights obtained over the previous one hour period of time, the previous day, and so forth. The user interface configuration module 120 then produces the configured user interface 124 by selecting one or more of the glucose insights and presenting a visual element 306 in the configured user interface 124 to represent the selected glucose insight 304.

Glucose insights are obtained for the user during a second period of time (block 1408), and the user interface is configured, based on the configuration data, to present at least a different visual element representing a different glucose insight of the glucose insights obtained during the second period of time (block 1410). By way of example, the user interface configuration module 120 obtains glucose insights 304 generated by the glucose insight engine 302 during a second period of time. The second period of time, for example, may correspond to a later period of time that occurs after the first period of time, e.g., the second period of time may occur an hour, day, week, or month after the first period of time. The user interface configuration module 120 then produces the configured user interface 124 by selecting one or more of the glucose insights and presenting a visual element 306 in the configured user interface 124 to represent the selected glucose insight 304.

In accordance with the principles discussed herein, the glucose insight is a different type of glucose insight than the different glucose insight. Notably, therefore, the configuration data 122 causes the visual elements and respective glucose insights to change over time, such as by presenting a color field to indicate whether the user's current glucose value is within a glucose range at a first period of time, and presenting an arrow indicating a trend of the user's glucose measurements at a second period of time. This change in glucose insights presented at different times based on configuration data may be based on a progressive reveal of glucose insights, a change in user preferences, user feedback data, and so forth.

Having described examples of procedures in accordance with one or more implementations, consider now an example of a system and device that can be utilized to implement the various techniques described herein.

Example System and Device

Figure 15:
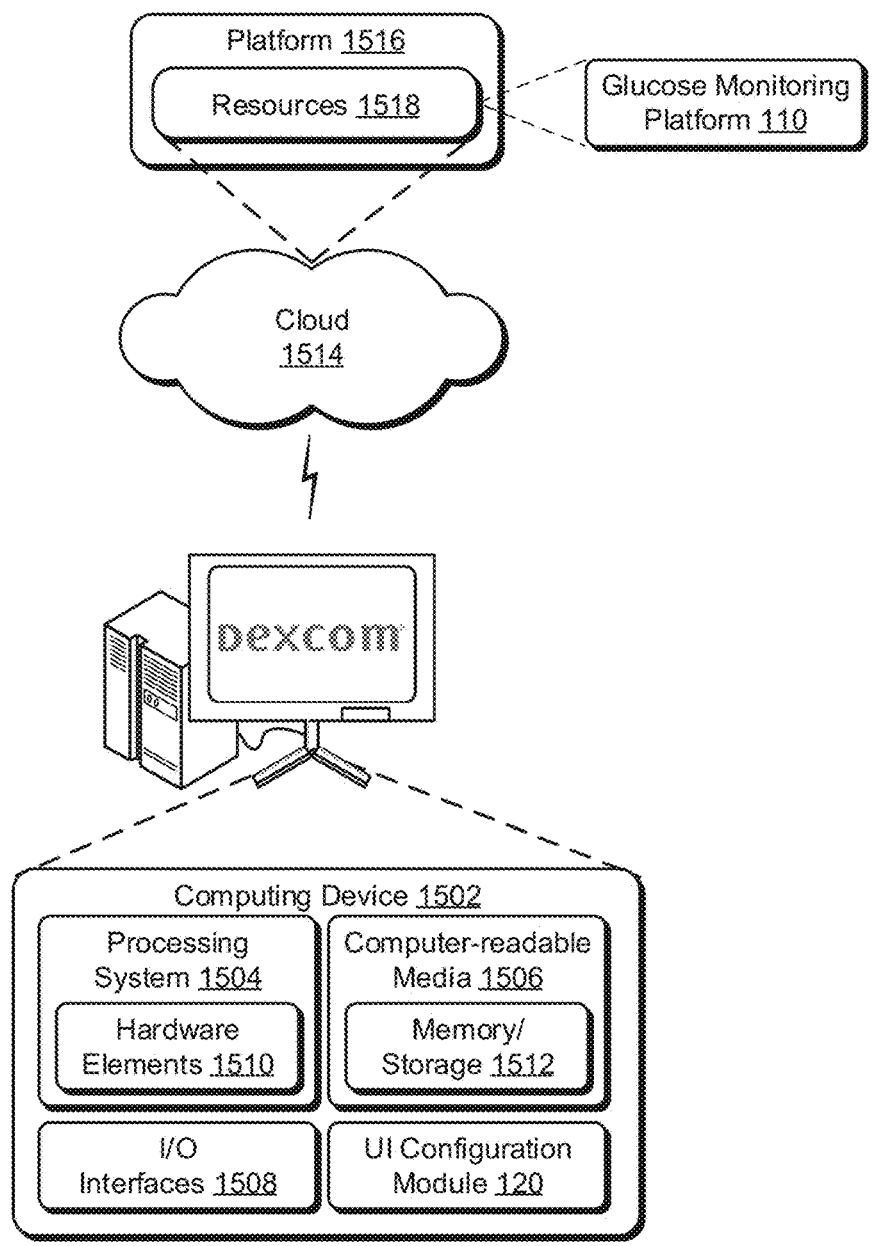
FIG. 15 illustrates an example of a system including various components of an example device that can be implemented as any type of computing device as described and/or utilized with reference to FIGS. 1-14 to implement embodiments of the techniques described herein.

FIG. 15 illustrates an example of a system generally at 1500 that includes an example of a computing device 1502 that is representative of one or more computing systems and/or devices that may implement the various techniques described herein. This is illustrated through inclusion of the user interface configuration module 120 and the glucose monitoring platform 110. The computing device 1502 may be, for example, a server of a service provider, a device associated with a client (e.g., a client device), an on-chip system, and/or any other suitable computing device or computing system.

The example computing device 1502 as illustrated includes a processing system 1504, one or more computer-readable media 1506, and one or more I/O interfaces 1508 that are communicatively coupled, one to another. Although not shown, the computing device 1502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1504 is representative of functionality to perform one or more operations using hardware. Accordingly, the processing system 1504 is illustrated as including hardware elements 1510 that may be configured as processors, functional blocks, and so forth. This may include implementation in hardware as an application specific integrated circuit or other logic device formed using one or more semiconductors. The hardware elements 1510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1506 is illustrated as including memory/storage 1512. The memory/storage 1512 represents memory/storage capacity associated with one or more computer-readable media. The memory/storage component 1512 may include volatile media (such as random access memory (RAM)) and/or nonvolatile media (such as read only memory (ROM), Flash memory, optical disks, magnetic disks, and so forth). The memory/storage component 1512 may include fixed media (e.g., RAM, ROM, a fixed hard drive, and so on) as well as removable media (e.g., Flash memory, a removable hard drive, an optical disc, and so forth). The computer-readable media 1506 may be configured in a variety of other ways as further described below.

Input/output interface(s) 1508 are representative of functionality to allow a user to enter commands and information to computing device 1502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1502. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1510 and computer-readable media 1506 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1510. The computing device 1502 may be configured to implement particular instructions and/or functions corresponding to the software and/or hardware modules. Accordingly, implementation of a module that is executable by the computing device 1502 as software may be achieved at least partially in hardware, e.g., through use of computer-readable storage media and/or hardware elements 1510 of the processing system 1504. The instructions and/or functions may be executable/operable by one or more articles of manufacture (for example, one or more computing devices 1502 and/or processing systems 1504) to implement techniques, modules, and examples described herein.

The techniques described herein may be supported by various configurations of the computing device 1502 and are not limited to the specific examples of the techniques described herein. This functionality may also be implemented all or in part through use of a distributed system, such as over a "cloud" 1514 via a platform 1516 as described below.

The cloud 1514 includes and/or is representative of a platform 1516 for resources 1518. The platform 1516 abstracts underlying functionality of hardware (e.g., servers) and software resources of the cloud 1514. The resources 1518 may include applications and/or data that can be utilized while computer processing is executed on servers that are remote from the computing device 1502. Resources 1518 can also include services provided over the Internet and/or through a subscriber network, such as a cellular or Wi-Fi network.

The platform 1516 may abstract resources and functions to connect the computing device 1502 with other computing devices. The platform 1516 may also serve to abstract scaling of resources to provide a corresponding level of scale to encountered demand for the resources 1518 that are implemented via the platform 1516. Accordingly, in an interconnected device embodiment, implementation of functionality described herein may be distributed throughout the system 1500. For example, the functionality may be implemented in part on the computing device 1502 as well as via the platform 1516 that abstracts the functionality of the cloud 1514.

CONCLUSION

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A method comprising:
obtaining glucose measurements of a user, the glucose measurements collected by a glucose monitoring device;
processing the glucose measurements to determine a glucose insight;
configuring a user interface of a glucose monitoring application, based on configuration data, to present a visual element representative of the glucose insight;
causing display of the configured user interface with the visual element representative of the glucose insight while preventing display of a number corresponding to a current glucose level of the user;
identifying a decline over time in a use of the glucose monitoring application by the user; and
in response to the identifying:
configuring the user interface to present the number corresponding to the current glucose level of the user, and
causing display of the configured user interface with the number and the visual element representative of the glucose insight.

2. The method of claim 1, wherein the configured user interface presents the visual element representative of the glucose insight without a glucose graph.

3. The method of claim 1, wherein the configured user interface presents the visual element representative of the glucose insight concurrently with a glucose graph that plots the glucose measurements of the user over a time period.

4. The method of claim 1, wherein the processing comprises processing the glucose measurements to determine a plurality of glucose insights for the user.

5. The method of claim 4, wherein the processing further comprises processing the glucose measurements along with additional data to determine the plurality of glucose insights, the additional data describing at least one of physiological markers, fitness or activities, health events, medication, meals, stress, sleep, or restorative events.

6. The method of claim 4, wherein the configuration data maps the plurality of glucose insights to different visual elements and controls which glucose insights of the plurality of glucose insights are presented to the user at a given time and how the glucose insights are presented using the different visual elements.

7. The method of claim 6, wherein the configuration data includes user specified preferences defining which glucose insights of the plurality of glucose insights are presented to the user at the given time or how the glucose insights are presented.

8. The method of claim 6, wherein the configuration data includes rules that define a progression of glucose insights for presentation to the user over time.

9. The method of claim 6, wherein the configuring the user interface further comprises selecting the glucose insight from the plurality of glucose insights determined for the user while preventing other ones of the plurality of glucose insights from being presented based on the configuration data.

10. The method of claim 6, wherein the configuring the user interface further comprises selecting the visual element representative of the determined glucose insight from a plurality of visual elements based on the configuration data.

11. The method of claim 1, wherein the determined glucose insight is based on a current glucose measurement of the user collected by the glucose monitoring device.

12. The method of claim 1, wherein the determined glucose insight comprises a trend of the glucose measurements of the user over a time period.

13. The method of claim 1, wherein the determined glucose insight comprises a rate of change of the glucose measurements of the user over a time period.

14. The method of claim 1, wherein the glucose insight comprises one of:
an indication of whether a current glucose measurement is below, within, or above a glucose range;
a trend of the glucose measurements over a time period;
a rate of change of the glucose measurements over the time period;
a variability of the glucose measurements over the time period;
a comparison of a variability of the glucose measurements over a current time period to a variability of the glucose measurements at one or more previous time periods;
a comparison of a current glucose measurement to one or more other glucose measurements for a same or similar time of day on one or more different days; or
a comparison of one or more of the glucose measurements to one or more other glucose measurements for a same meal on one or more different days.

15. The method of claim 1, wherein the configuring comprises configuring the user interface, based on configuration data, to present an additional visual element representative of an additional glucose insight determined for the user.

16. The method of claim 15, wherein the glucose insight is based on a current glucose measurement of the user and wherein the additional glucose insight determined for the user comprises a trend of the collected glucose measurements of the user over a time period.

17. The method of claim 16, wherein the visual element comprises a color field that represents whether the current glucose measurement of the user is below, within, or above a glucose range, and wherein the additional visual element comprises a shape that represents whether the trend of the collected glucose measurements of the user are increasing, decreasing, or constant over the time period.

18. The method of claim 1, wherein the visual element is a color or a shape, and the visual element does not include a number.

19. The method of claim 18, wherein the color is selected from a predetermined color field based on the glucose insight.

20. The method of claim 18, wherein the shape is a predetermined shape corresponding to the glucose insight.

21. The method of claim 1, wherein the number and the visual element representative of the glucose insight are progressively displayed via a smart watch.

22. The method of claim 1, wherein an initial presentation of the visual element and a subsequent presentation of the number are performed in accordance with predetermined configuration data.

23. A method comprising:
obtaining configuration data that maps glucose insights to different visual elements and controls which glucose insights are presented in a user interface of a glucose monitoring application at a given time and how the glucose insights are presented in the user interface using the different visual elements;
obtaining a first glucose level and a first glucose insight for a user during a first period of time;
configuring the user interface, based on the configuration data, to present a first visual element representing the first glucose insight obtained during the first period of time while preventing display of a first number corresponding to the first glucose level of the user;
obtaining a second glucose level and a second glucose insight for the user during a second period of time;
configuring the user interface, based on the configuration data, to present a second visual element representing the second glucose insight obtained during the second period of time while preventing display of a second number corresponding to the second glucose level of the user;
identifying a decline between the first period of time and the second period of time in a use of the glucose monitoring application by the user; and
in response to the identifying:
configuring the user interface to present the second number corresponding to the second glucose level of the user, and
causing display of the configured user interface with the second number and the second visual element representative of the second glucose insight.

24. The method of claim 23, wherein the configuration data causes presentation of the second visual element representing the second glucose insight based on rules defining a progression of glucose insights for presentation to the user over time.

25. The method of claim 23, wherein the configuration data causes presentation of the second visual element representing the second glucose insight based on user specified preferences obtained after the first period of time.

26. The method of claim 23, wherein the first visual element comprises a color field that represents whether a current glucose measurement of the user is below, within, or above a glucose range, and wherein the second visual element comprises a shape that represents a trend of glucose measurements of the user over the second period of time.

27. The method of claim 23, wherein the first visual element representing the first glucose insight is presented along with the second visual element representing the second glucose insight during the second period of time.

28. The method of claim 23, wherein a glucose graph that plots glucose measurements obtained during the second period of time is presented along with the first visual element representing the first glucose insight and the second visual element representing the second glucose insight during the second period of time.

29. The method of claim 23, wherein the first visual element representing the first glucose insight is not presented with the second visual element representing the second glucose insight during the second period of time.

30. A computing device comprising:
a display device; and
at least a memory and a processor to implement a glucose monitoring application, the glucose monitoring application-configured to:
present a user interface of the glucose monitoring application on the display device, the user interface comprising a first visual element representative of a first glucose insight and a second visual element representative of a second glucose insight while preventing the display of a number corresponding to a current glucose level of the user,
identify a decline over time in a use of the glucose monitoring application by the user; and
in response to the identifying, present the user interface on the display device, the user interface comprising the number corresponding to the current glucose level of the user, the first visual element, and the second visual element.

31. The computing device of claim 30, wherein the first visual element comprises a color field that represents whether a current glucose measurement of the user is below, within, or above a glucose range, and wherein the second visual element comprises a shape that represents whether a trend of collected glucose measurements of the user are increasing, decreasing, or constant over a time period.

32. The computing device of claim 31, wherein the user interface further comprises a glucose graph that plots the collected glucose measurements over the time period.

33. A computer-readable storage device comprising instructions stored thereon that, responsive to execution by one or more processors, performs operations comprising:
obtaining glucose measurements of a user, the glucose measurements collected by a glucose monitoring device;
processing the glucose measurements to determine a glucose insight;
configuring a user interface of a glucose monitoring application, based on configuration data, to present a visual element representative of the glucose insight;
causing display of the configured user interface with the visual element representative of the glucose insight while preventing display of a number corresponding to a current glucose level of the user;
identifying a decline over time in a use of the glucose monitoring application by the user; and
in response to the identifying:
configuring the user interface to present the number corresponding to the current glucose level of the user, and
causing display of the configured user interface with the number and the visual element representative of the glucose insight.

* * * * *